(12) United States Patent
Katakura

(10) Patent No.: US 8,432,623 B2
(45) Date of Patent: Apr. 30, 2013

(54) ZOOM LENS AND IMAGING APPARATUS USING THE SAME

(75) Inventor: Masahiro Katakura, Chofu (JP)

(73) Assignee: Olympus Imaging Corp., Toyko (JP)

( * ) Notice: Subject to any disclaimer, the term of this patent is extended or adjusted under 35 U.S.C. 154(b) by 407 days.

(21) Appl. No.: 12/653,124

(22) Filed: Dec. 7, 2009

(65) Prior Publication Data

US 2010/0149406 A1 Jun. 17, 2010

(30) Foreign Application Priority Data

Dec. 16, 2008 (JP) ................................ 2008-319404

(51) Int. Cl.
*G02B 9/58* (2006.01)

(52) U.S. Cl.
USPC ........................................................ 359/782

(58) Field of Classification Search .................. 359/782
See application file for complete search history.

(56) References Cited

U.S. PATENT DOCUMENTS

| | | | | |
|---|---|---|---|---|
| 4,439,017 | A * | 3/1984 | Yamaguchi | 359/687 |
| 2007/0279759 | A1 * | 12/2007 | Hozumi et al. | 359/680 |
| 2008/0117523 | A1 * | 5/2008 | Ichikawa et al. | 359/676 |
| 2008/0165261 | A1 * | 7/2008 | Kamo | 348/240.3 |
| 2009/0195886 | A1 * | 8/2009 | Hankawa et al. | 359/687 |

FOREIGN PATENT DOCUMENTS

| | | |
|---|---|---|
| JP | 2004-318110 | 11/2004 |
| JP | 2005-321561 | 11/2005 |
| JP | 2006-138969 | 6/2006 |
| JP | 2007-327991 | 12/2007 |

* cited by examiner

*Primary Examiner* — James Hannett
(74) *Attorney, Agent, or Firm* — Kenyon & Kenyon LLP

(57) ABSTRACT

A zoom lens comprises, in order from an object side, a first lens group with a negative refracting power; a second lens group with a positive refracting power; a third lens group with a positive refracting power; and a fourth lens group with a refracting curved surface. Upon zooming from a wide-angle end to telephoto end, at least the first lens group, second lens group, and third lens group move, and a spacing between the respective lens groups are changed. The first lens group comprises; in order from the object side to an image side, a negative lens component with a negative refracting power and a positive lens component with a positive refracting power which are arranged on an optical axis with a predetermined spacing therebetween. The total number of the lens components in the first lens group is two. The second lens group comprises at least three lenses including at least one negative lens and at least one positive lens and comprises a plurality of cemented surfaces, at least two of which are obtained by cementing two face-to-face refracting surfaces of two lenses each having different curvature on the object side surface and image side surface.

18 Claims, 22 Drawing Sheets

Example 1

Example 1

Example 2

Example 3

Example 4

Example 5

Example 6

Example 7

Example 8

Example 9

Example 3

(a)

(b)

(c)

ZOOM LENS AND IMAGING APPARATUS USING THE SAME

CROSS REFERENCE TO RELATED APPLICATIONS

This application claims benefit of Japanese Application No. 2008-319404 filed in Japan on Dec. 16, 2008, the contents of which are incorporated by this reference.

BACKGROUND OF THE INVENTION

1. Field of the Invention

The present invention relates to a zoom lens and an imaging apparatus using the same.

2. Description of the Related Art

In recent years, digital cameras that form an image on an imaging surface of an imaging device such as a CCD or C-MOS sensor and electrically record the image have become popular, replacing cameras of a type that expose an image of an object on a film. Users of digital cameras of a popular type desire to easily enjoy photographing at various locations without any restriction of time and place. Therefore, compact-type digital cameras are now popular choices. A use of a small-sized imaging device allows the size of the digital camera to be reduced as compared to that of a camera using a film.

In the filed of such a digital camera, achievement of sufficient miniaturization, wide angle of view, and high zoom ratio is required. As a zoom lens advantageous in ensuring sufficient miniaturization and wide angle of view, a negative lead type zoom lens system in which a lens group having a negative refracting power is arranged nearest the side at which an object is located is disclosed in, e.g., Patent Document 1 (JP-A-2005-321561) and Patent Document 2 (JP-A-2004-318110).

However, in a zoom lens disclosed in Patent Document 1, the total number of lens components included in a first lens group is large, which is disadvantageous in the size reduction of the zoom lens at the time when it is retreated in a collapsed manner in a camera body.

Meanwhile, in a zoom lens disclosed in Patent Document 2, only one lens component is included in a first lens group, which is disadvantageous in achieving the wide angle of view and high zoom ratio in view of influence on off-axis aberration.

Further, in the zoom lenses disclosed in the above Patent Documents, the number of bonding surfaces is only one although a second lens group has three or more lenses, which is disadvantageous in achieving the high zoom ratio in view of influence on axial chromatic aberration and chromatic aberration of magnification. In addition, positioning of respective lens components included in the second lens group is made through a frame, making it easy to cause decentering among the lenses, which may result in occurrence of aberration due to manufacturing error.

The present invention has been made in view of the above problems and an object thereof is to provide a zoom lens advantageous in achieving wide angle of view, high zoom ratio, and sufficient miniaturization while maintaining optical performance thereof and an imaging apparatus using the zoom lens.

In view of the above problems, according to a first aspect of the present invention, there is provided a zoom lens including in order from an object side: a first lens group with a negative refracting power; a second lens group with a positive refracting power; a third lens group with a positive refracting power; and a fourth lens group with a refracting curved surface, wherein upon zooming from a wide-angle end to telephoto end, at least the first lens group, second lens group, and third lens group move, and a spacing between the respective lens groups are changed.

The first lens group includes, in order from the object side to an image side, a negative lens component with a negative refracting power and a positive lens component with a positive refracting power which are arranged on an optical axis with a predetermined spacing therebetween, and the total number of the lens components in the first lens group is two.

The second lens group includes at least three lenses including at least one negative lens and at least one positive lens and includes a plurality of cemented surfaces, at least two of which are obtained by cementing two face-to-face refracting surfaces of two lenses each having different curvature on the object side surface and image side surface.

The lens component is a lens body having only two refracting surfaces that contact the air on the optical axis: one is the object-side surface and the other is the image-side surface.

In the case where the zoom lens has a focusing function, the zoom lens is assumed to be focused on the farthest point.

As described above, the configuration in which the first lens group has a negative refracting power is advantageous in a reduction of the number of lens groups constituting the zoom lens and widening of the angle of view. The configuration in which the second lens group has a positive refracting power can impart a zoom function to this second lens group. The configuration in which the third lens group has a positive refracting power is advantageous in adjustment of the exit pupil position at the wide-angle end and telephoto end and in correction of field curvature. The configuration in which the fourth lens group having a refracting curved surface is arranged on the image side of the third lens group is advantageous in a reduction in field curvature at the wide-angle end. Further, the configuration in which the third lens group moves upon focusing is advantageous in a reduction in field curvature on a short-distance object point.

The configuration in which the first lens group includes, in order from the object side to the image side, a negative lens component with a negative refracting power and a positive lens component with a positive refracting power makes the principal point of the first lens group closer to the object side to easily reduce the diameter size of the first lens group or the entire length of the zoom lens. Further, this configuration is advantageous in a reduction in chromatic aberration of the first lens group and reduction in on-axis aberration at the telephoto end, in spite of a small number of lens components.

When the second lens group is configured as described above, a reduction in on-axis aberration and in chromatic aberration of magnification of the second lens group are advantageously achieved. In addition, the second lens group has a plurality of cemented surfaces. That is, a plurality of lenses are directly jointed to one another without use of mirror frames, making it easy to reduce influence on aberration due to relative decentering between lenses. Thus, wide angle of view and high zoom ratio are advantageously achieved.

Preferably, the abovementioned lens satisfies the following requirements.

It is preferable that the zoom lens have an aperture stop that moves in unison with the second lens group upon zooming from the wide-angler end to telephoto end. In this case, the beam diameter in the second lens group can be made small, which is advantageous in a reduction in the size of the zoom lens and reduction in aberration. The aperture stop may be arranged on the object side of the second lens group, on the image side thereof, or in the second lens group. When the aperture stop is arranged on the image side of the second lens group, correction of on-axis aberration is advantageously achieved.

It is preferable that the second lens group satisfy the following conditional expression (1):

$$0.8 < D_{G2}/fw < 3.0 \tag{1}$$

where $D_{G2}$ is thickness of the second lens group on the optical axis, and fw is focal length of the entire zoom lens system at the wide-angle end.

The conditional expression (1) represents a preferable thickness of the second lens group on the optical axis. Abiding by the lower limit of the conditional expression (1) advantageously reduces a variation of aberration at the wide-angle end and telephoto end upon zooming and a reduction in spherical aberration and astigmatism. Abiding by the upper limit of the conditional expression (1) advantageously reduces the thickness of the zoom lens.

It is preferable that the second lens group include a plurality of positive lenses, one of which nearest to the object side and one of which nearest to the image side satisfy the following conditional expression (2):

$$0.5 < \phi_{G2PF}/\phi_{G2PR} < 25.0 \tag{2}$$

where $\phi_{G2PF}$ is refracting power of the most object-side positive lens of the plurality of positive lenses included in the second lens group, and $\phi_{G2PR}$ is refracting power of the most image-side positive lens thereof.

The conditional expression (2) represents preferable distribution of a refracting power for the positive lens in the second lens group. Abiding by the lower and upper limits of the conditional expression (2) enables setting of the respective refracting powers (inverse numbers of focal lengths) of the positive lens to adequate values, thereby advantageously reducing on-axis aberration, which leads to a high zoom ratio.

When the total number of the positive lenses in the second lens group is set to two, a size reduction of the second lens group and low cost production can be achieved.

It is preferable that the total number of the cemented surfaces in the second lens group satisfy the following conditional expression (3):

$$2 \leq N_{2Gcem} \leq 4 \tag{3}$$

where $N_{2Gcem}$ is total number of the cemented surfaces in the second lens group, which is an integer.

The conditional expression (3) represents a preferable total number of the cemented surfaces in the second lens group. Abiding by the lower limit of the conditional expression (3) advantageously corrects on-axis aberration, field curvature, and astigmatism. Abiding by the upper limit of the conditional expression (3) reduces the total number of lenses in the second lens group, advantageously reducing the thickness of the zoom lens at the time when it is retreated in a collapsed manner in a camera body.

Further, it is more preferable that the lens component including the cemented surface have a positive lens and a negative lens, which is advantageous in correction of various aberrations.

It is preferable that the first lens group satisfy the following conditional expression (4):

$$0.10 < D_{L12}/D_{G1} < 0.80 \tag{4}$$

where $D_{G1}$ is thickness of the first lens group on the optical axis, and $D_{L12}$ is distance on the optical axis between the negative lens component and positive lens component in the first lens group.

The conditional expression (4) represents a preferable distance between the first and second lens components in the first lens group. Abiding by the lower limit of the conditional expression (4) makes the principal point of the first lens group closer to the object side while reducing field curvature at the wide-angle end to easily reduce the diameter size of the first lens group, thereby advantageously achieving a wide angle of view. Abiding by the upper limit of the conditional expression (4) advantageously reduces the size of the zoom lens at the time when it is retreated in a collapsed manner in a camera body.

It is preferable that the negative lens component in the first lens group satisfies the following conditional expression (5):

$$-1.0 < (r_{1a}+r_{1b})/(r_{1a}-r_{1b}) < 0.98 \tag{5}$$

where $r_{1a}$ is paraxial curvature radius of the object side surface of the negative lens component in the first lens group, and $r_{1b}$ is paraxial curvature radius of the image side surface of the negative lens component in the first lens group.

The conditional expression (5) represents a preferable shape of the negative lens component in the first lens group. Abiding by the lower and upper limits of the conditional expression (5) enables setting of the curvatures of the object side surface and image side surface to adequate values, thereby preventing occurrence of field curvature at the wide-angle end and spherical aberration at the telephoto end.

Further, it is preferable that the total number of the lens components in the second lens group be one, two, or three. With this configuration, it is possible to satisfactorily correct the on-axis aberration while reducing the thickness of the zoom lens at the time when it is retreated in a collapsed manner in a camera body.

Further, it is preferable that the sum of the total number of the lens components in the third lens group and that of the lens components in the fourth lens group be three or less. This configuration is advantageous in the size reduction.

Further, it is preferable that the fourth lens group have a negative refracting power and that the zoom lens be a four-group zoom lens. The configuration in which the zoom lens includes, in order from the object side, a first lens group with a negative refracting power, a second lens group with a positive refracting power, a third lens group with a positive refracting power, and a fourth lens group with a negative refracting power makes the arrangement of signs (+, −) of the refracting power symmetrical, which is advantageous in correction of on-axis aberration and reduction in the size of the zoom lens.

It is preferable that the following conditional expression (6) is satisfied:

$$0.5 < D_{G3G4}/D_{L12} < 3 \tag{6}$$

where $D_{G3G4}$ is distance on the optical axis between the third lens group and fourth lens group at the wide-angle end, and $D_{L12}$ is distance on the optical axis between the negative and positive lens components in the first lens group.

The conditional expression (6) is a conditional expression for satisfactorily achieving symmetry in an optical system in which negative-positive-positive-negative lens groups are arranged in order from the object side so as to satisfactorily correct the entire aberration. In particular, this configuration is effective for off-axis aberration. Abiding by the lower and upper limits of the conditional expression (6) satisfactorily achieves symmetry in the arrangement of the refracting powers in the entire zoom lens, thereby advantageously reducing various aberrations, in particular, off-axis aberration.

It is preferable that the first lens component satisfy the following conditional expression (7):

$$1.87 < \text{AVE}(nd_{G1}) < 2.40 \quad (7)$$

where $\text{AVE}(nd_{G1})$ is average value of the refractive indices of all the lenses in the first lens group.

The conditional expression (7) specifies a preferable average value of the refractive indices of the lenses constituting the first lens group. By abiding by the lower limit of the conditional expression (7) to ensure the refractive index, it is easily possible to ensure the refractive index of the first lens group required to ensure a satisfactory angle of view or zoom ratio while reducing occurrence of aberration at each lens surface. Abiding by the upper limit of the conditional expression (7) advantageously reduces material cost.

According to a second aspect of the present invention, there is provided a zoom lens including in order from the object side: a first lens group with a negative refracting power; a second lens group with a positive refracting power; and a third lens group with a positive refracting power.

Upon zooming from a wide-angle end to telephoto end, at least the first lens group, second lens group, and third lens group move, and a spacing between the respective lens groups are changed.

The second lens group includes at least three lenses including at least one negative lens and at least one positive lens and includes a plurality of cemented surfaces, at least two of which are obtained by cementing two face-to-face refracting surfaces of two lenses each having different curvature on the object side surface and image side surface.

The first lens group satisfies the following conditional expression (7):

$$1.87 < \text{AVE}(nd_{G1}) < 2.40 \quad (7)$$

where $\text{AVE}(nd_{G1})$ is average value of the refractive indices of all the lenses in the first lens group.

As described above, when the conditional expression (7) is satisfied, it is possible to obtain a negative refracting power of the first lens group required to ensure a satisfactory angle of view or zoom ratio while reducing cost of the first lens group and occurrence of aberration in the first lens group.

Thus, it is possible to advantageously reduce the number of lenses constituting the first lens group, ensure a satisfactory angle of view, and reduce the entire lens length.

The function of the second lens group in the second aspect has been described in the first aspect of the present invention.

Further, it is preferable that the zoom lens include a fourth lens group having a refracting curved surface on the image side of the third lens group. This configuration is advantageous in a reduction in field curvature.

In the case where the third lens group moves upon focusing, it is possible to advantageously reduce a variation of field curvature.

Further, it is preferable that the invention according to the second aspect and any of the above configuration requirements be satisfied at the same time.

Further, it is preferable that the fourth lens group remain fixed upon zooming. The configuration in which the fourth lens group remains fixed upon zooming allows significant simplification of the mechanical structure, thereby reducing the thickness of the zoom lens at the time when it is retreated in a collapsed manner in a camera body and cost.

Further, it is preferable that the third lens group move for focusing and that the first, second, and fourth lens groups remain fixed upon the focusing operation. The configuration in which the fourth lens group remains fixed also upon focusing allows significant simplification of the mechanical structure, thereby reducing the thickness of the zoom lens at the time when it is retreated in a collapsed manner in a camera body and cost.

Further, according to another aspect of the present invention, there is provided an imaging apparatus including: a zoom lens; and an imaging device having an imaging surface arranged on the image side of the zoom lens and is adapted to convert an optical image formed on the imaging surface into electric signals, wherein the zoom lens is any of the zoom lenses described above.

In this case, it is preferable that imaging apparatus include an image transformation section that transforms the electric signals containing distortion from the zoom lens into image signals with distortion corrected by image processing.

In an image obtained through a zoom lens, trade-off relationship may be found between the distortion and astigmatism at the wide-angle end. Therefore, recording or display of the image is performed after the astigmatism is optically corrected and barrel distortion likely to occur at the wide-angle end is electrically corrected, leading to a size reduction of the zoom lens and an improvement in quality of an image to be recorded.

Further, it is preferable that the imaging apparatus include an image transformation section that transforms the electric signals including chromatic aberration of magnification from the zoom lens into image signals in which the chromatic aberration of magnification has been corrected by image processing. For example, when the distortion is electrically corrected for each color signal, the chromatic aberration of magnification is accordingly corrected. This allows sharing of occurrence of the chromatic aberration of magnification of the zoom lens itself, which is advantageous in a reduction in material cost and zoom lens size.

It is preferable that a plurality of the above configuration requirements be satisfied at the same time. Further, when following changes are made to the respective conditional expressions, the effect can reliably be demonstrated.

In the conditional expression (1), the lower limit value is preferably 0.9 and more preferably 1.0, and upper limit value is preferably 2.0 and more preferably 1.5.

In the conditional expression (2), the lower limit value is preferably 0.7, and upper limit value is preferably 5.0 and more preferably 1.0.

In the conditional expression (3), the upper limit value is preferably 3, and $N_{2Gcem}$ is preferably 2.

In the conditional expression (4), the lower limit value is preferably 0.2 and more preferably 0.25, and upper limit value is preferably 0.6 and more preferably 0.4.

In the conditional expression (5), the lower limit value is preferably 0.1 and more preferably 0.4, and upper limit value is preferably 0.85 and more preferably 0.75.

In the conditional expression (6), the lower limit value is preferably 1.0 and more preferably 1.2, and upper limit value is preferably 2.7 and more preferably 2.5.

In the conditional expression (7), the lower limit value is preferably 1.90 and more preferably 1.92, and upper limit value is preferably 2.3 and more preferably 2.2.

As described above, according to the present invention, it is possible to provide a zoom lens advantageous in achieving wide angle of view, high zoom ratio, and sufficient miniaturization while maintaining optical performance thereof and an imaging apparatus using the zoom lens.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DETAILED DESCRIPTION OF THE PREFERRED EMBODIMENTS

Application of the devices as described above allows any of the following examples to provide a zoom lens having a high zoom ratio, a small diameter-direction size, and satisfactory optical performance.

When a zoom lens according to each of the following examples is used as a photographing lens of a compact digital camera, a digital camera having a small thickness in the depth direction of the camera but having a wide angle of view, high zoom ratio, and excellent optical performance can be provided.

The following examples are each directed to a zoom lens of the type wherein lenses are let out at the startup of an imaging apparatus as well as an imaging apparatus incorporating the same. Examples 1 to 9 each provide a zoom lens having higher optical performance and improved in terms of compactness. Throughout Examples 1 to 9, the effective imaging area is of constant rectangular shape in all zooming states. In the respective examples, the values for the specific conditions have been found at the time of focusing on an object point at infinity. Total length is the axial distance from the entrance surface to the exit surface of the zoom lens plus a back focus BF as calculated on an air basis.

The zoom lens according to each of the examples moves from the wide-angle end to telephoto end in the following manner. A first lens group moves toward the image side and then moves toward the object side. A second lens group moves toward only the object side. A third lens group moves in a different manner for each example. A fourth lens group remains fixed in Examples 1 to 6 and 8 and moves in Examples 7 and 9. In Examples 1 to 6 and 8, the third lens group is let out toward the object side for short-range focusing. In Examples 7 and 9, the fourth lens group is let out toward the object side for short-range focusing.

The zoom lens of the present invention will be described with reference to Examples 1 to 9. FIGS. 1 to 9 each show a lens cross-section at the wide-angle end (a), in the intermediate states (b) and at the telephoto end (c) upon focusing on an object point at infinity.

Throughout FIGS. 1 to 9, G1 stands for the first lens group; G2 the second lens group; G3 the third lens group; G4 the fourth lens group; S an aperture stop; FS a flare stop; F an optical low-pass filter with IR cut coating; C the cover glass of a CCD that is an electronic imaging device; and I the image plane of the CCD. Note here that for the IR cut coating, it may be coated directly on the optical low-pass filter F or, alternatively, there may be another infrared cut absorption filter located.

Figure 1:
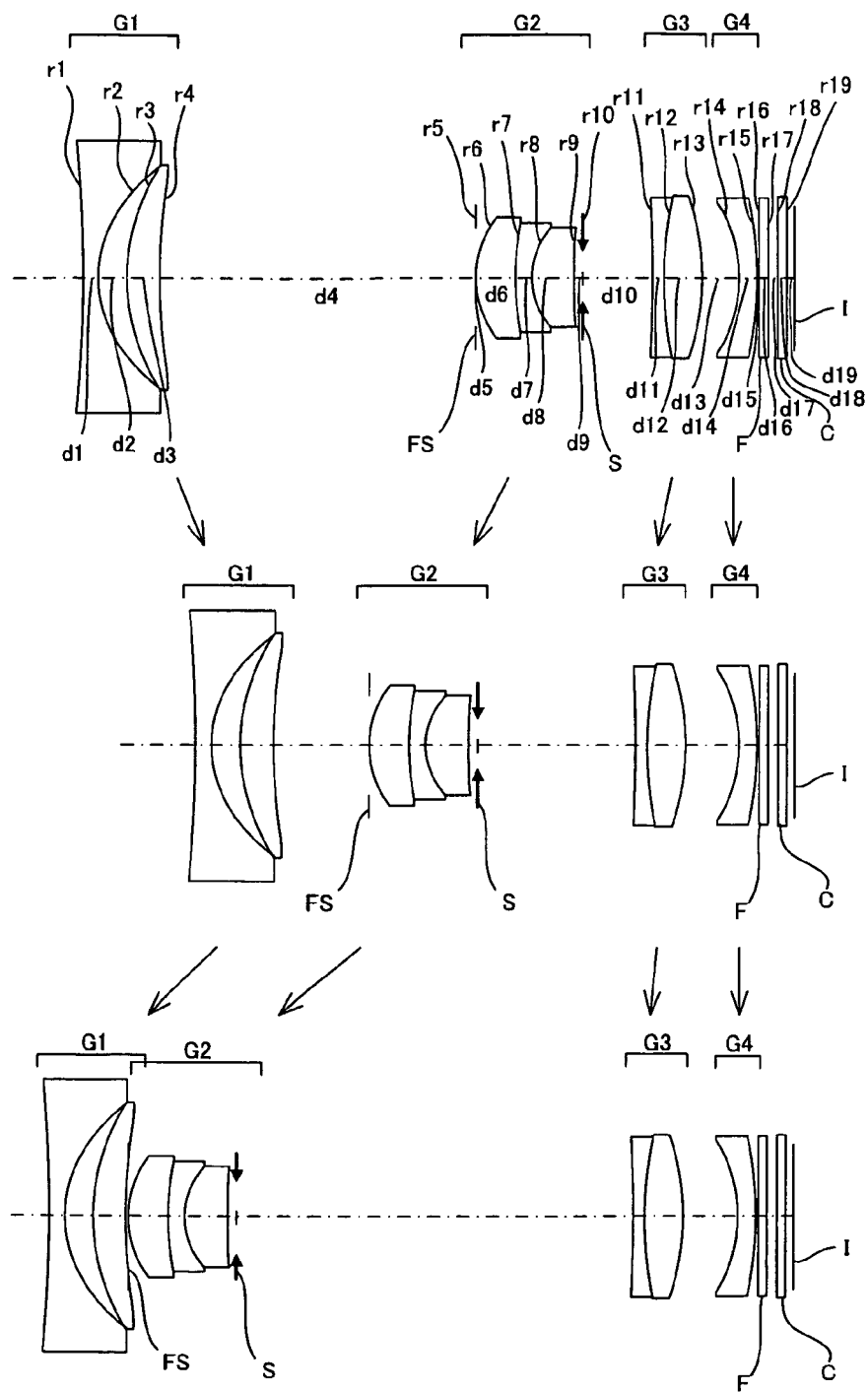
FIG. 1 is a cross-sectional view of a zoom lens according to Example 1 of the present invention at the wide-angle end (a), in the intermediate states (b) and at the telephoto end (c) upon focusing on an object point at infinity.

As shown in FIG. 1, the zoom lens of Example 1 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side, a negative meniscus lens having a convex surface directed toward the object side, and a double-convex positive lens and an aperture stop S; the third lens group G3 is made up of a cemented lens of a double-concave negative lens and a double-convex positive lens; and the fourth lens group G4 is made up of one negative meniscus lens having a convex surface directed toward the image side.

Eight aspheric surfaces are used: two at both the surfaces of the double-concave negative lens and two at both the surfaces of the positive meniscus lens in the first lens group G1; one at the surface of the cemented lens nearest to the object side and one at the surface of the cemented lens nearest to the image side in the second lens group G2; and two at both the surfaces of the negative meniscus lens in the fourth lens group G4.

Figure 2:
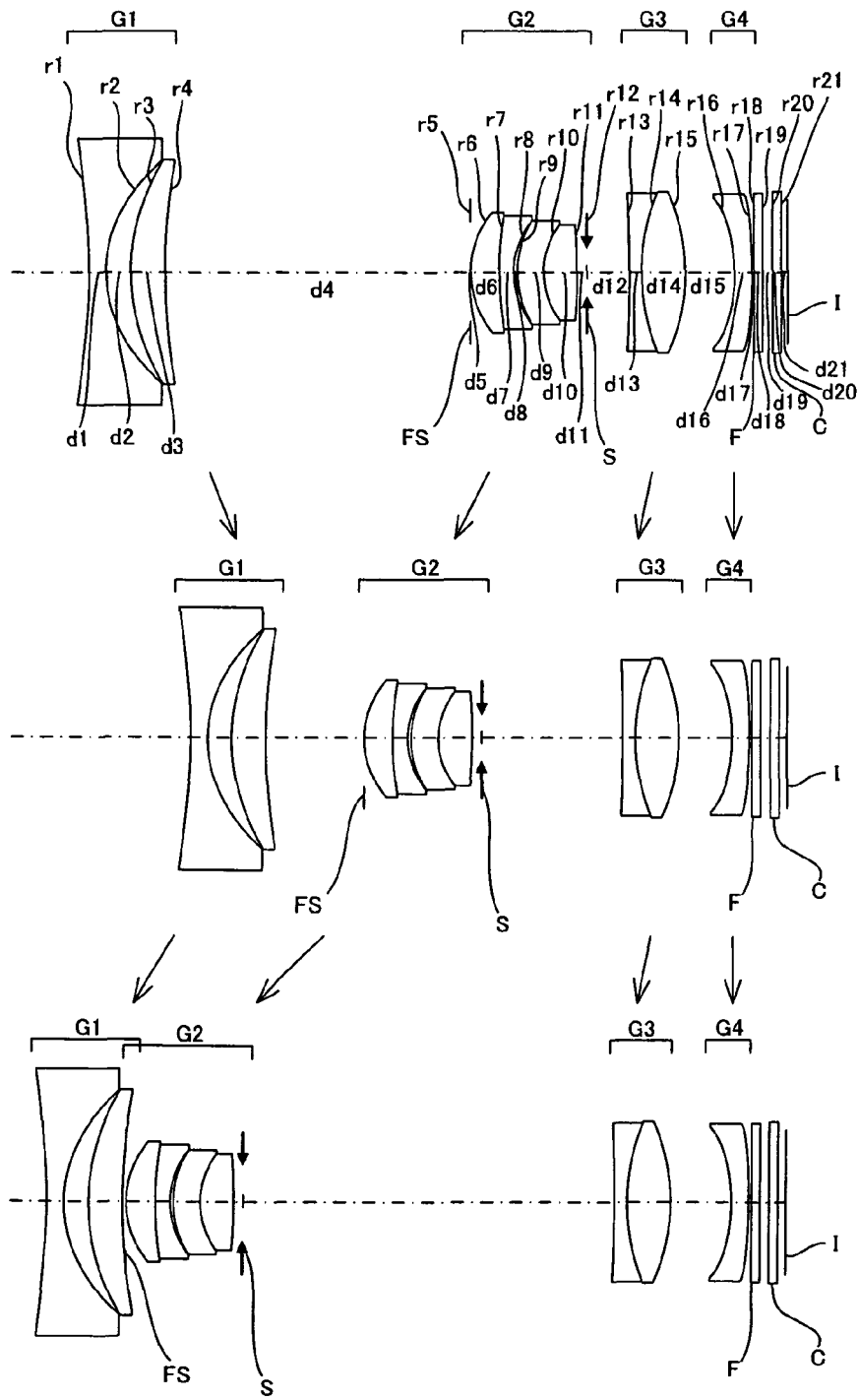
FIG. 2 is a cross-sectional view of a zoom lens according to Example 2 of the present invention, similar to FIG. 1.

As shown in FIG. 2, the zoom lens of Example 2 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side and a negative meniscus lens having a convex surface directed toward the object side, a cemented lens of a negative meniscus lens having a convex surface directed toward the object side and a double-convex positive lens, and an aperture stop S; the third lens group G3 is made up of a cemented lens of a double-concave negative lens and a double-convex positive lens; and the fourth lens group G4 is made up of one negative meniscus lens having a convex surface directed toward the image side.

Eight aspheric surfaces are used: two at both the surfaces of the double-concave negative lens in the first lens group G1; two at the surfaces of the object side cemented lens nearest to the object side and nearest to the image side and one at the surface of the image side cemented lens nearest to the image side in the second lens group G2; one at the surface of the cemented lens nearest to the image side in the third lens group G3; and two at both the surfaces of the negative meniscus lens in the fourth lens group G4.

Figure 3:
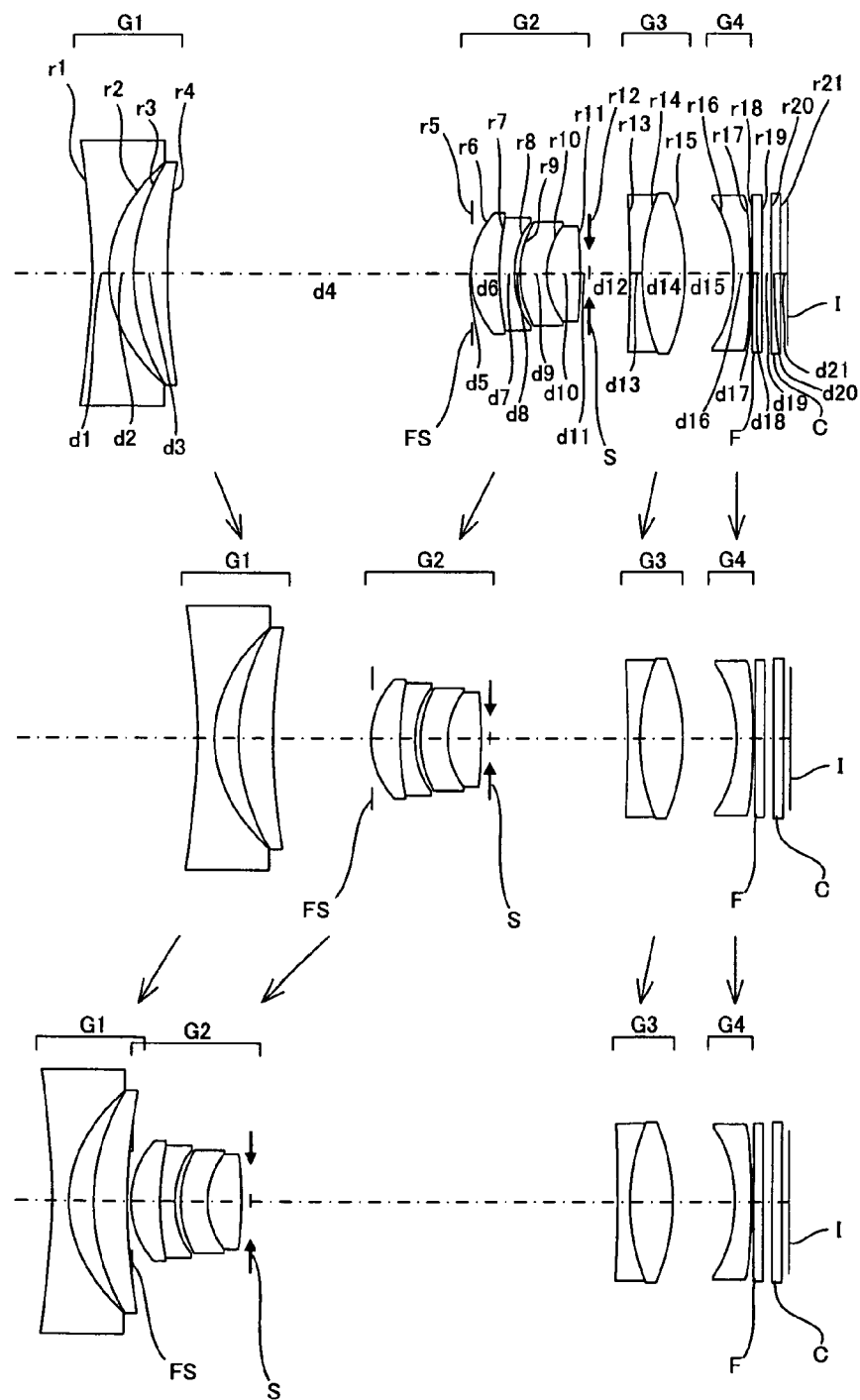
FIG. 3 is a cross-sectional view of a zoom lens according to Example 3 of the present invention, similar to FIG. 1.

As shown in FIG. 3, the zoom lens of Example 3 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end, while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side and a negative meniscus lens having a convex surface directed toward the object side, a cemented lens of a negative meniscus lens having a convex surface directed toward the object side and a double-convex positive lens, and an aperture stop S; the third lens group G3 is made up of a cemented lens of a double-concave negative lens and a double-convex positive lens; and the fourth lens group G4 is made up of one negative meniscus lens having a convex surface directed toward the image side.

Eight aspheric surfaces are used: two at both the surfaces of the double-concave negative lens in the first lens group G1; two at the surfaces of the object side cemented lens nearest to the object side and nearest to the image side and one at the surface of the image side cemented lens nearest to the image side in the second lens group G2; one at the surface of the cemented lens nearest to the image side in the third lens group G3; and two at both the surfaces of the negative meniscus lens in the fourth lens group G4.

Figure 4:
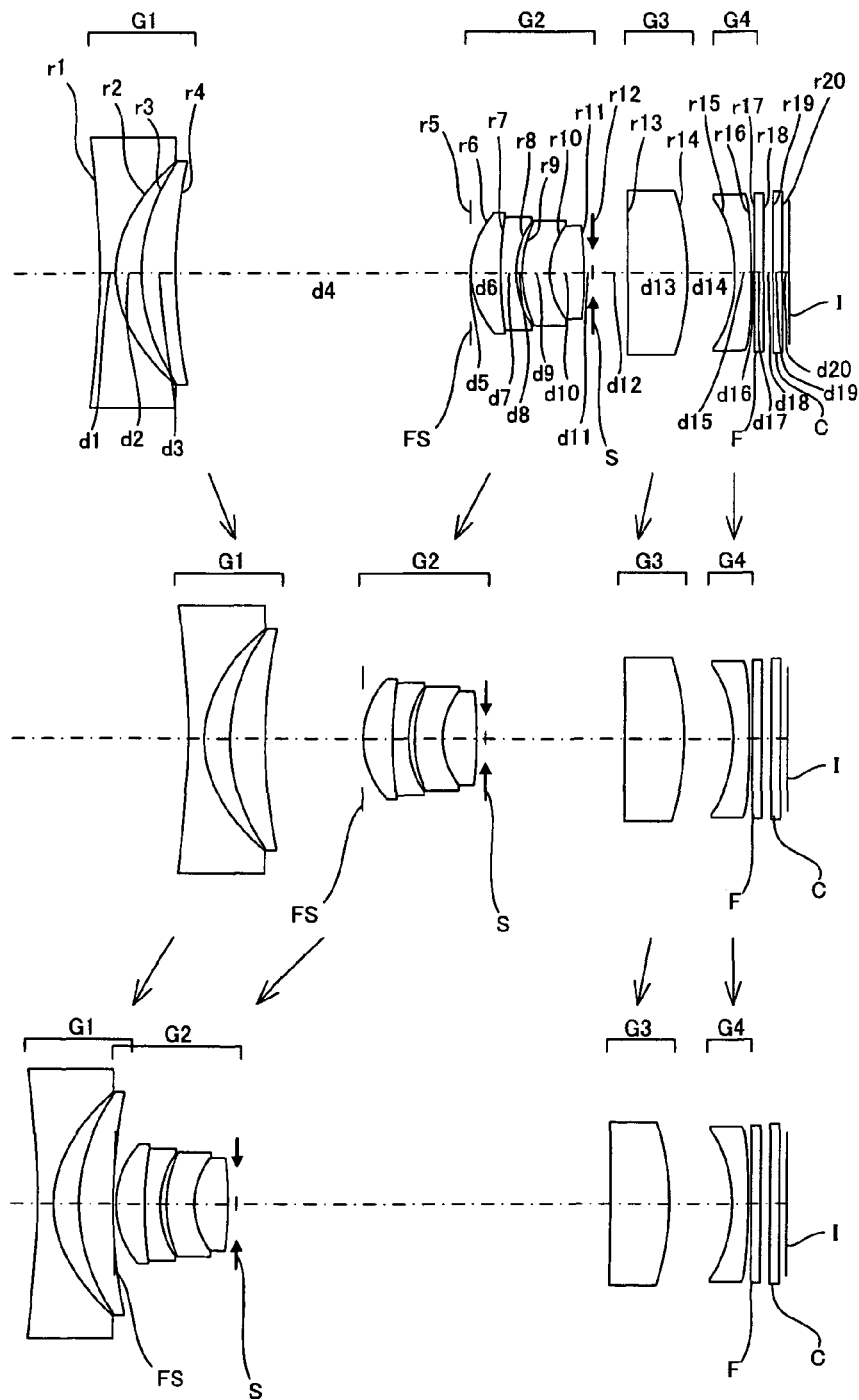
FIG. 4 is a cross-sectional view of a zoom lens according to Example 4 of the present invention, similar to FIG. 1.

As shown in FIG. 4, the zoom lens of Example 4 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side and a negative meniscus lens having a convex surface directed toward the object side, a cemented lens of a negative meniscus lens having a convex surface directed toward the object side and a double-convex positive lens, and an aperture stop S; the third lens group G3 is made up of one positive meniscus lens having a convex surface directed to the image side; and the fourth lens group G4 is made up of one negative meniscus lens having a convex surface directed toward the image side.

Nine aspheric surfaces are used: two at both the surfaces of the double-concave negative lens in the first lens group G1; two at the surfaces of the object side cemented lens nearest to the object side and nearest to the image side and one at the surface of the image side cemented lens nearest to the image side in the second lens group G2; two at both the surfaces of the positive meniscus lens in the third lens group G3; and two at both the surfaces of the negative meniscus lens in the fourth lens group G4.

Figure 5:
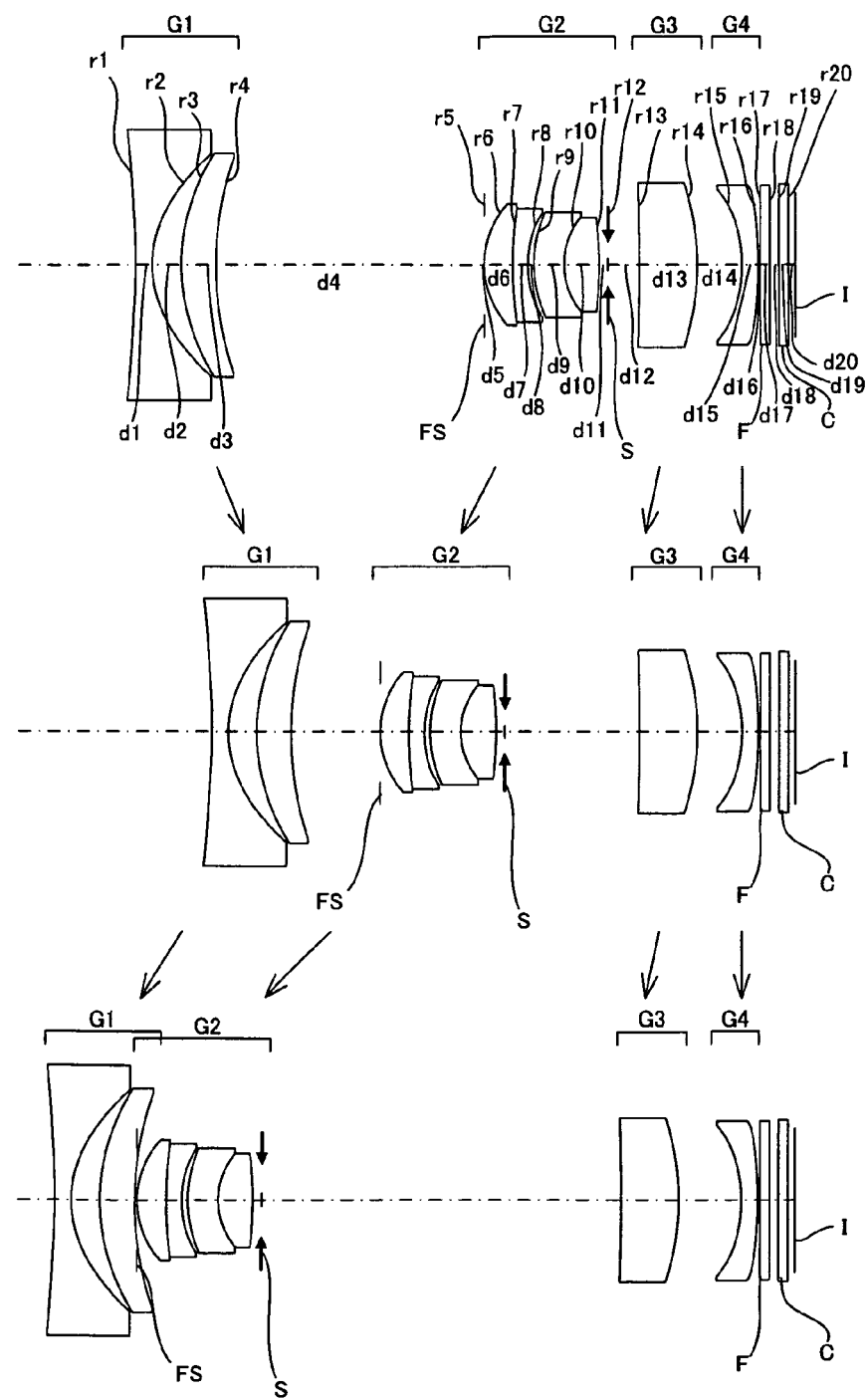
FIG. 5 is a cross-sectional view of a zoom lens according to Example 5 of the present invention, similar to FIG. 1.

As shown in FIG. 5, the zoom lens of Example 5 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the image side from the wide-angle end to the intermediate state while the spacing between the second lens group G2 and it grows wide and the spacing between the fourth lens group G4 and it grows wide. Then, from the intermediate state to the telephoto end, the third lens group G3 moves toward the object side while the spacing between the second lens group G2 and it grows wide and the spacing between the fourth lens group G4 and it grows wide. At the telephoto end, the third lens group G3 is positioned more on the object side than at the wide-angle end.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side and a negative meniscus lens having a convex surface directed toward the object side, a cemented lens of a negative meniscus lens having a convex surface directed toward the object side and a double-convex positive lens, and an aperture stop S; the third lens group G3 is made up of one positive meniscus lens having a convex surface directed to the image side; and the fourth lens group G4 is made up of one negative meniscus lens having a convex surface directed toward the image side.

Nine aspheric surfaces are used: two at both the surfaces of the double-concave negative lens in the first lens group G1; two at the surfaces of the object side cemented lens nearest to the object side and nearest to the image side and one at the surface of the image side cemented lens nearest to the image side in the second lens group G2; two at both the surfaces of the positive meniscus lens in the third lens group G3; and two at both the surfaces of the negative meniscus lens in the fourth lens group G4.

Figure 6:
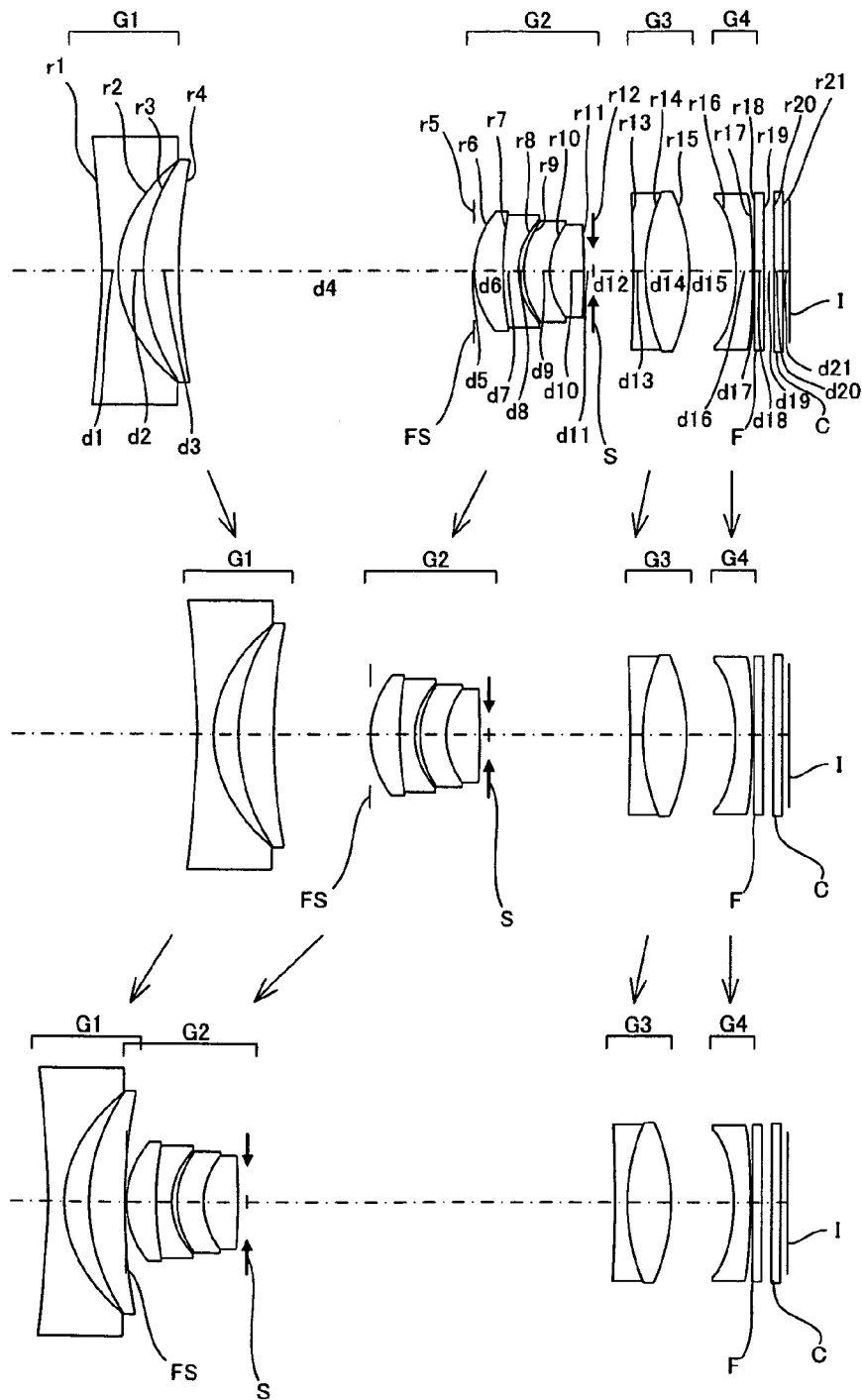
FIG. 6 is a cross-sectional view of a zoom lens according to Example 6 of the present invention, similar to FIG. 1.

As shown in FIG. 6, the zoom lens of Example 6 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side and a negative meniscus lens having a convex surface directed toward the object side, a cemented lens of a negative meniscus lens having a convex surface directed toward the object side and a double-convex positive lens, and an aperture stop S; the third lens group G3 is made up of a cemented lens of a double-concave negative lens and a double-convex positive lens; and the fourth lens group G4 is made up of one negative meniscus lens having a convex surface directed toward the image side.

Eight aspheric surfaces are used: two at both the surfaces of the double-concave negative lens in the first lens group G1; two at the surfaces of the object side cemented lens nearest to the object side and nearest to the image side and one at the surface of the image side cemented lens nearest to the image side in the second lens group G2; one at the surface of the cemented lens nearest to the image side in the third lens group G3; and two at both the surfaces of the negative meniscus lens in the fourth lens group G4.

Figure 7:
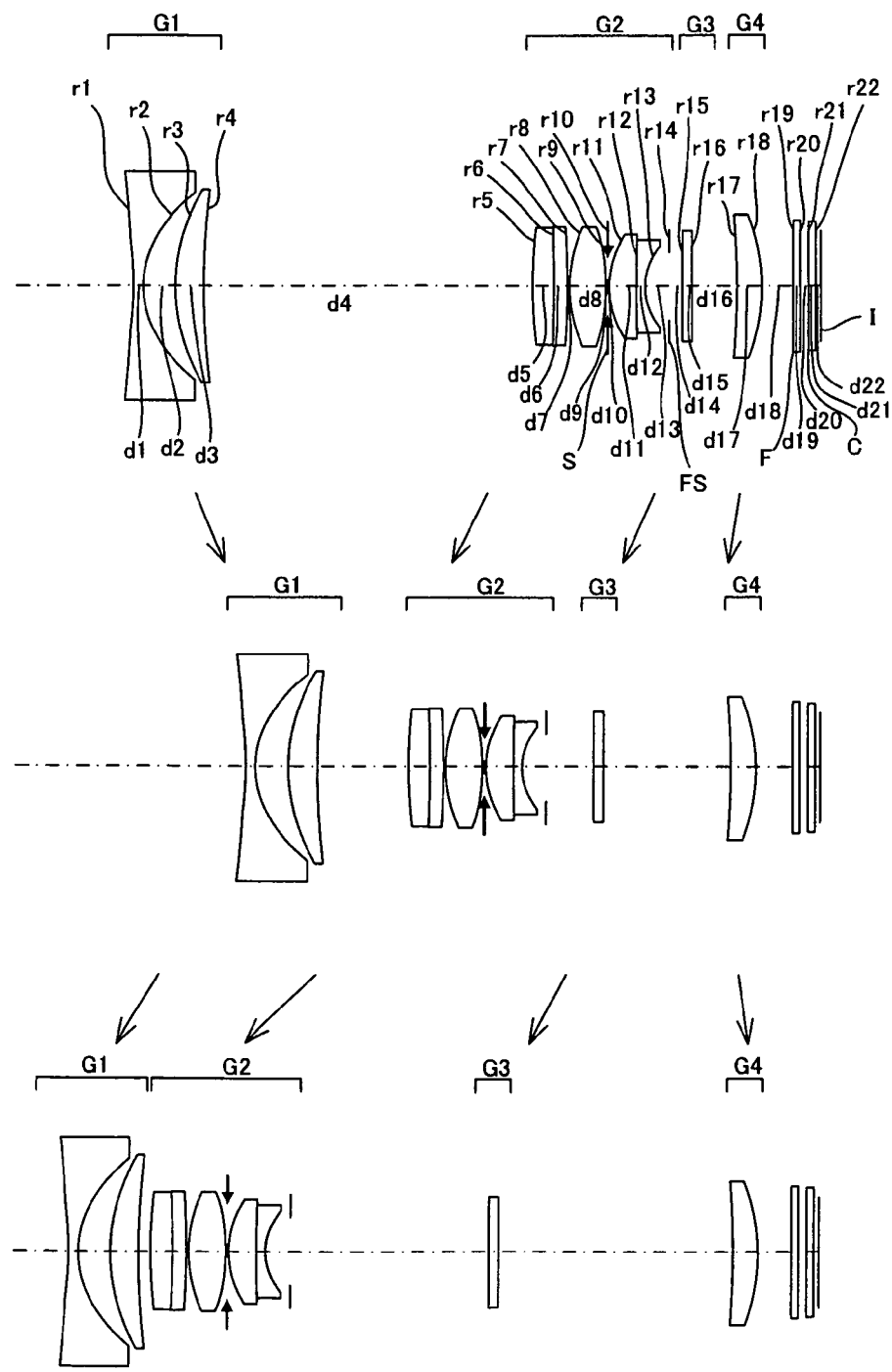
FIG. 7 is a cross-sectional view of a zoom lens according to Example 7 of the present invention, similar to FIG. 1.

As shown in FIG. 7, the zoom lens of Example 7 includes, in order from the object side, the first lens group G1 with a negative refracting power, second lens group G2 with a positive refracting power, aperture stop S, third lens group G3 with a positive refracting power, and fourth lens group G4 with a positive refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 moves toward the object side from the wide-angle end to the intermediate state and moves toward the image side from the intermediate state to the telephoto end. At the telephoto end, the fourth lens group G4 is positioned more on the object side than at the wide-angle end.

In order from the object side, the first lens group G1 is made up of a double-concave negative lens and a positive meniscus lens having a convex surface directed toward the object side; the second lens group G2 is made up of a cemented lens of a double-convex positive lens and a positive meniscus lens having a convex surface directed toward the image side, a double-convex positive lens, an aperture stop S, and a cemented lens of a positive meniscus lens having a convex surface directed toward the object side and a negative meniscus lens having a convex surface directed toward the object side; the third lens group G3 is made up of one double-convex positive lens; and the fourth lens group G4 is made up of one positive meniscus lens having a convex surface directed toward the image side.

Seven aspheric surfaces are used: two at both the surfaces of the double-concave negative lens and two at both the surfaces of the positive meniscus lens in the first lens group G1; two at the surfaces of the object side cemented lens nearest to the object side and nearest to the image side in the second lens group G2; and one at the image side surface of the positive meniscus lens the in the fourth lens group G4.

Figure 8:
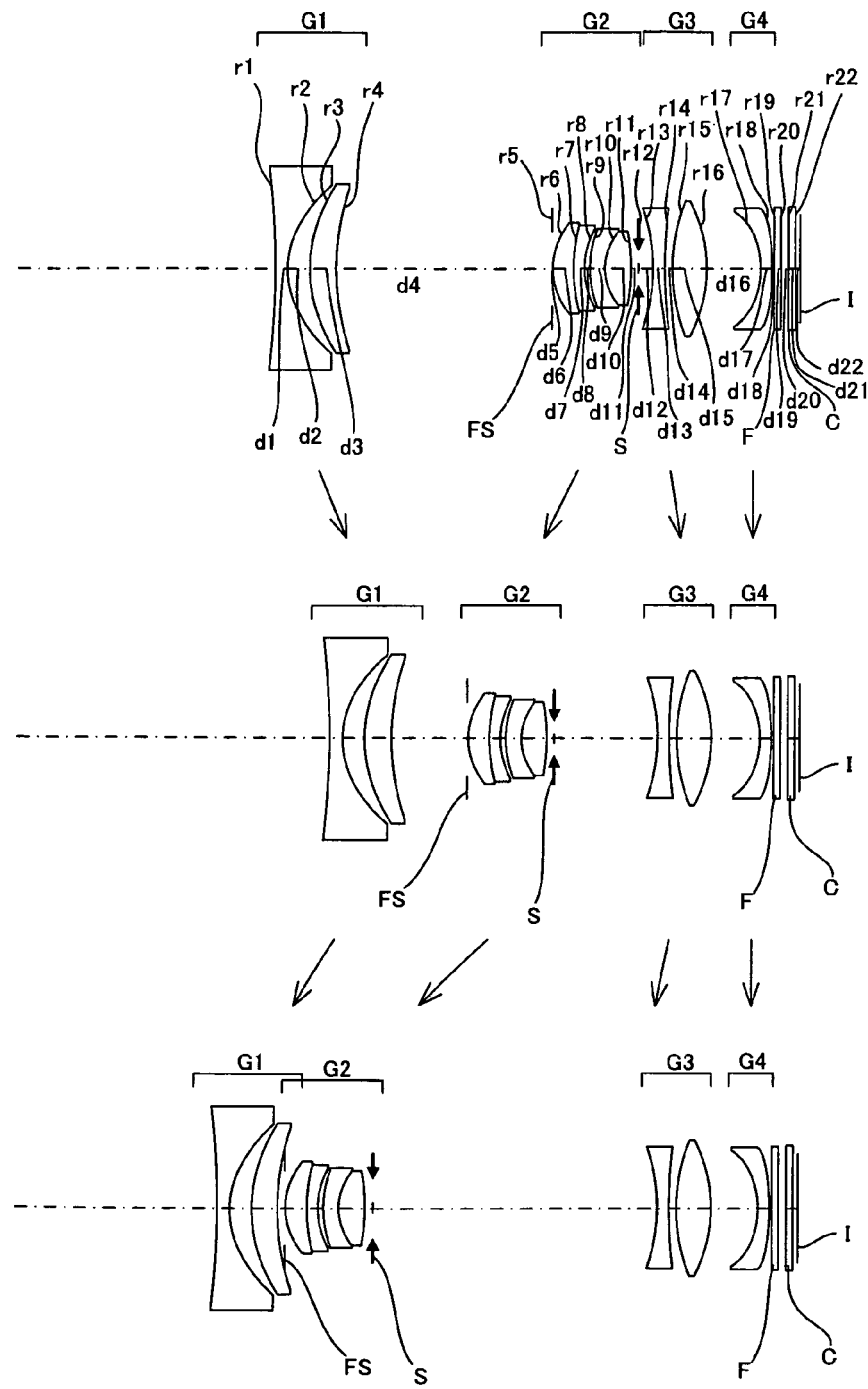
FIG. 8 is a cross-sectional view of a zoom lens according to Example 8 of the present invention, similar to FIG. 1.

As shown in FIG. 8, the zoom lens of Example 8 includes, in order from the object side, the first lens group G1 with a negative refracting power, second lens group G2 with a positive refracting power, aperture stop S, third lens group G3 with a positive refracting power, and fourth lens group G4 with a negative refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the image side from the wide-angle end to the telephoto end while the spacing between the second lens group G2 and it grows wide and the spacing between the fourth lens group G4 and it becomes narrow.

The fourth lens group G4 remains fixed.

In order from the object side, the first lens group G1 is made up of a double-concave negative lens and a positive meniscus lens having a convex surface directed toward the object side; the second lens group G2 is made up of a cemented lens of a positive meniscus lens having a convex surface directed toward the object side and a negative meniscus lens having a convex surface directed toward the object side, a cemented lens of a negative meniscus lens having a convex surface directed toward the object side and a double-convex positive lens, and an aperture stop S; the third lens group G3 is made up of a double-concave negative lens and a double-convex positive lens; and the fourth lens group G4 is made up of one negative meniscus lens having a convex surface directed toward the image side.

Nine aspheric surfaces are used: two at both the surfaces of the double-concave negative lens in the first lens group G1; two at the surfaces of the object side cemented lens nearest to the object side and nearest to the image side and one at the surface of the image side cemented lens nearest to the image side in the second lens group G2; one at the object side surface of the double-concave negative lens and one at the image side surface of the double-convex positive lens in the third lens group G3; and two at both the surfaces of the negative meniscus lens in the fourth lens group G4.

Figure 9:
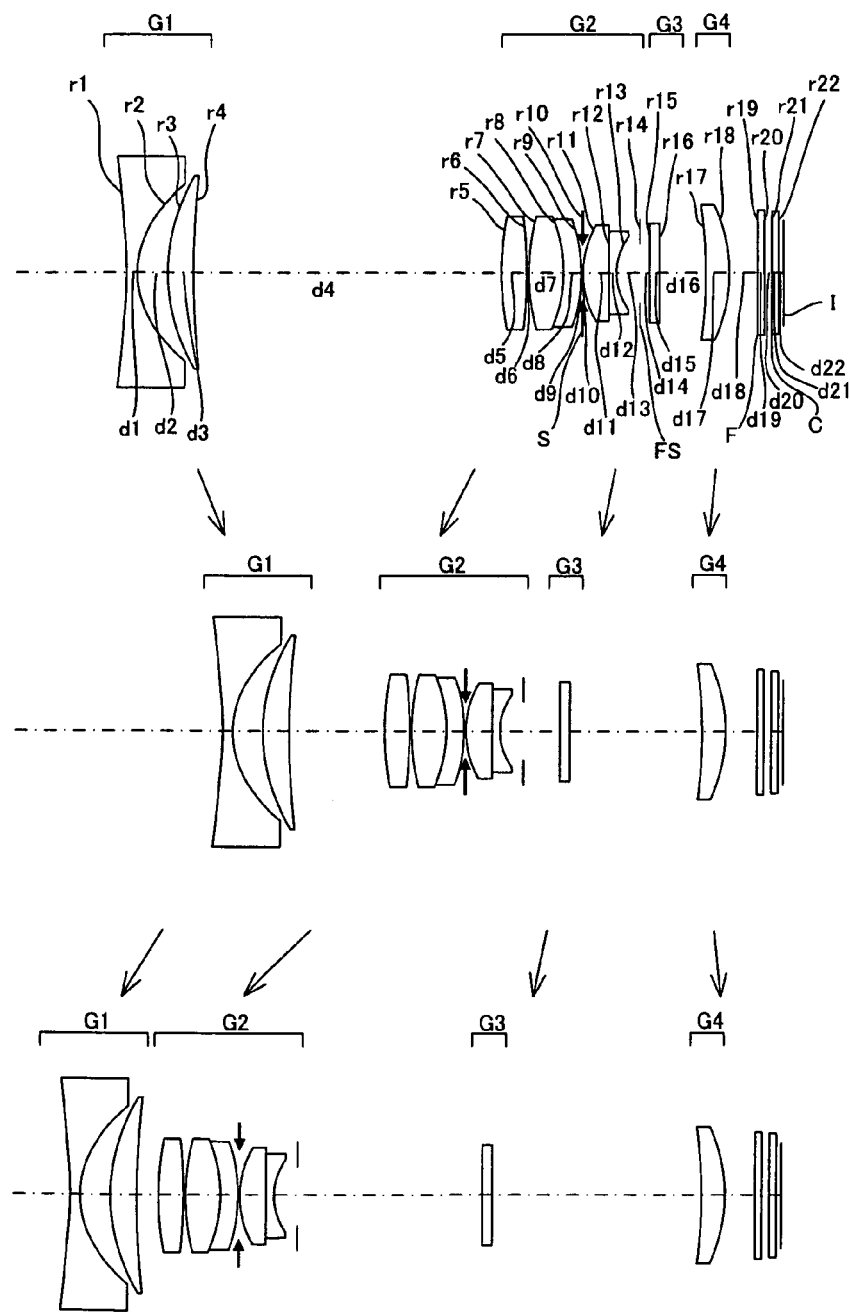
FIG. 9 is a cross-sectional view of a zoom lens according to Example 9 of the present invention, similar to FIG. 1.
Figure 10:
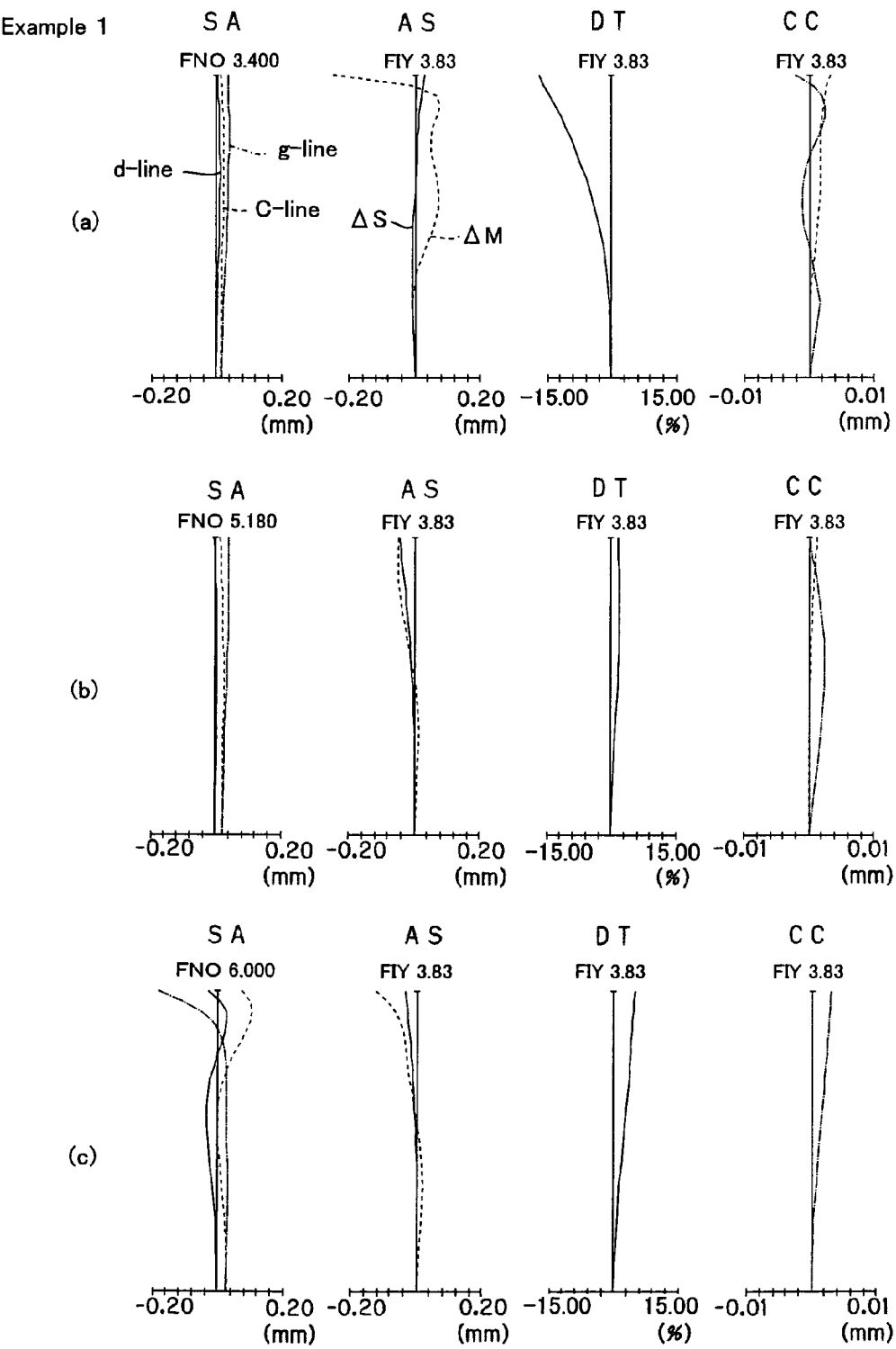
FIGS. 10A to 10C are aberration diagrams for Example 1 upon focusing on an object point at infinity.
Figure 11:
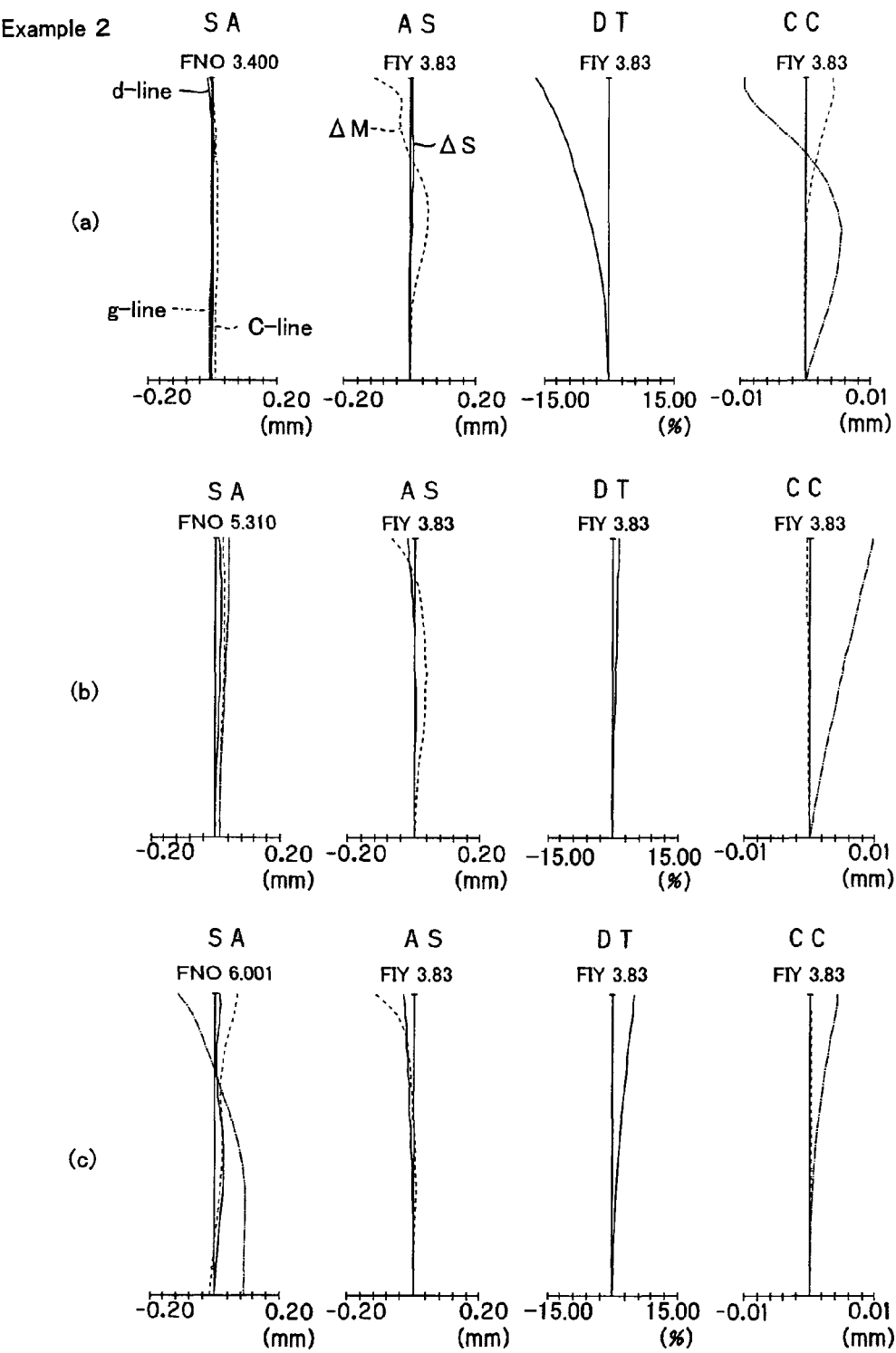
FIGS. 11A to 11C are aberration diagrams for Example 2 upon focusing on an object point at infinity.
Figure 12:
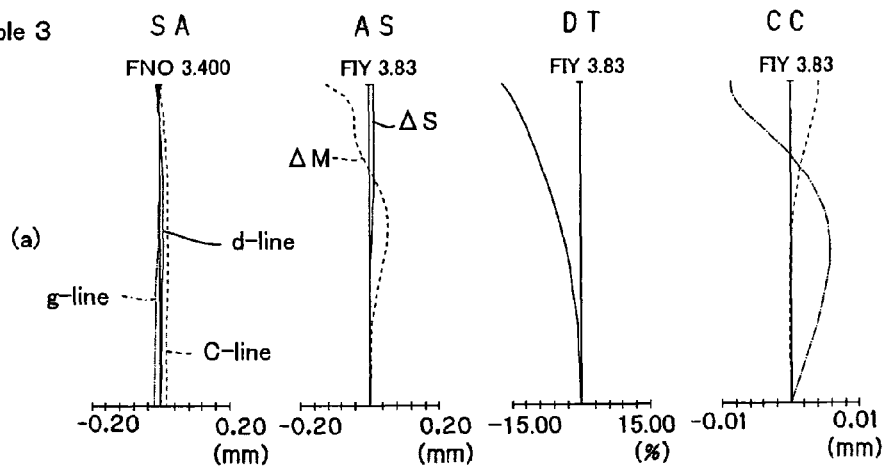
FIGS. 12A to 12C are aberration diagrams for Example 3 upon focusing on an object point at infinity.
Figure 12:
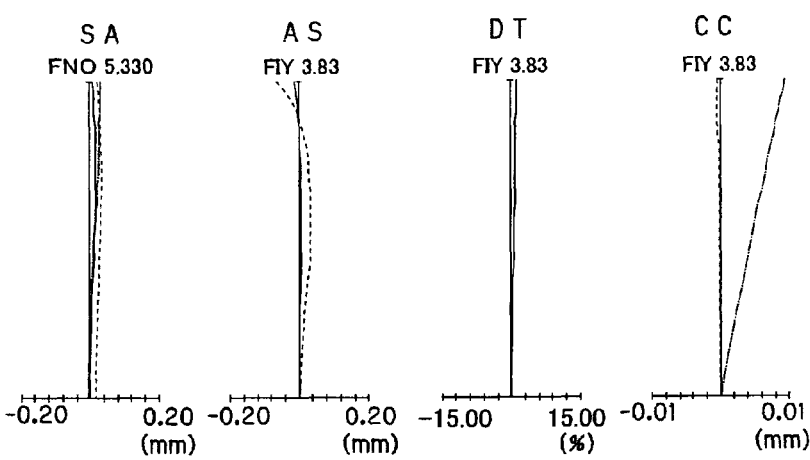
Figure 12:
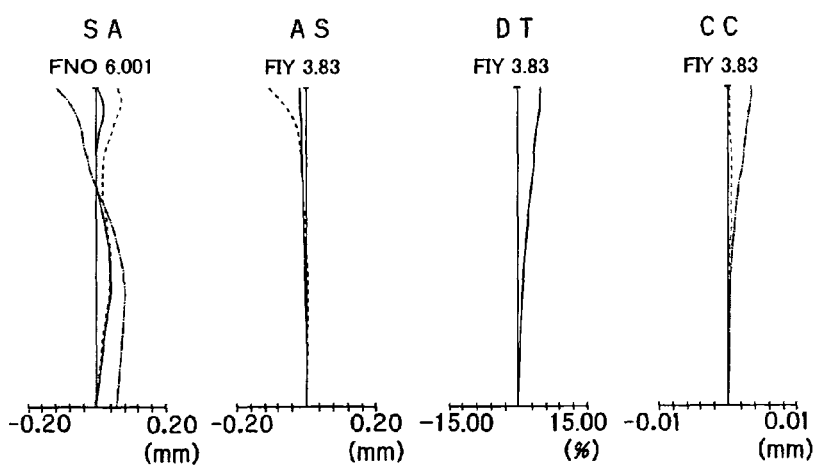
Figure 13:
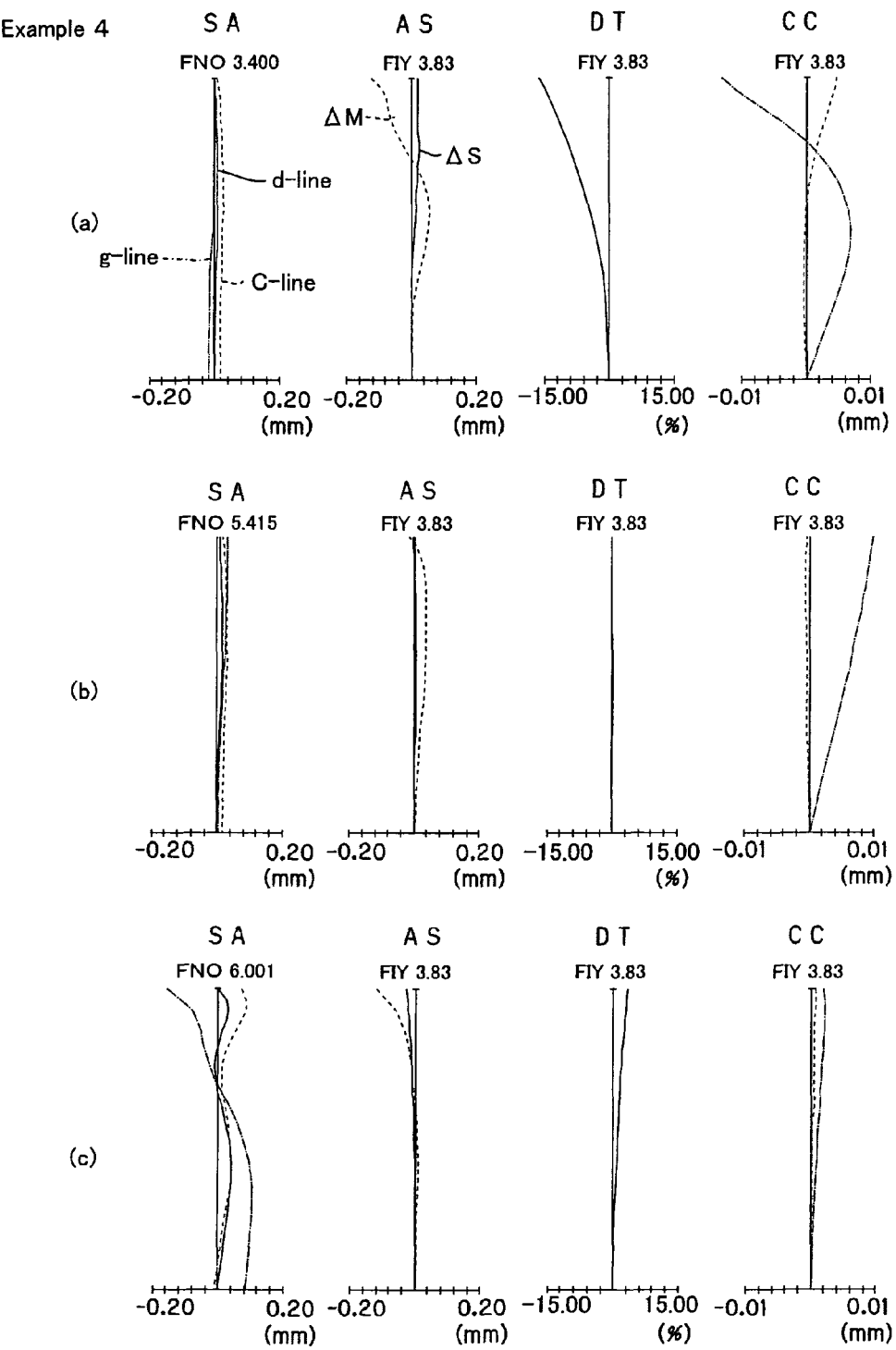
FIGS. 13A to 13C are aberration diagrams for Example 4 upon focusing on an object point at infinity.
Figure 14:
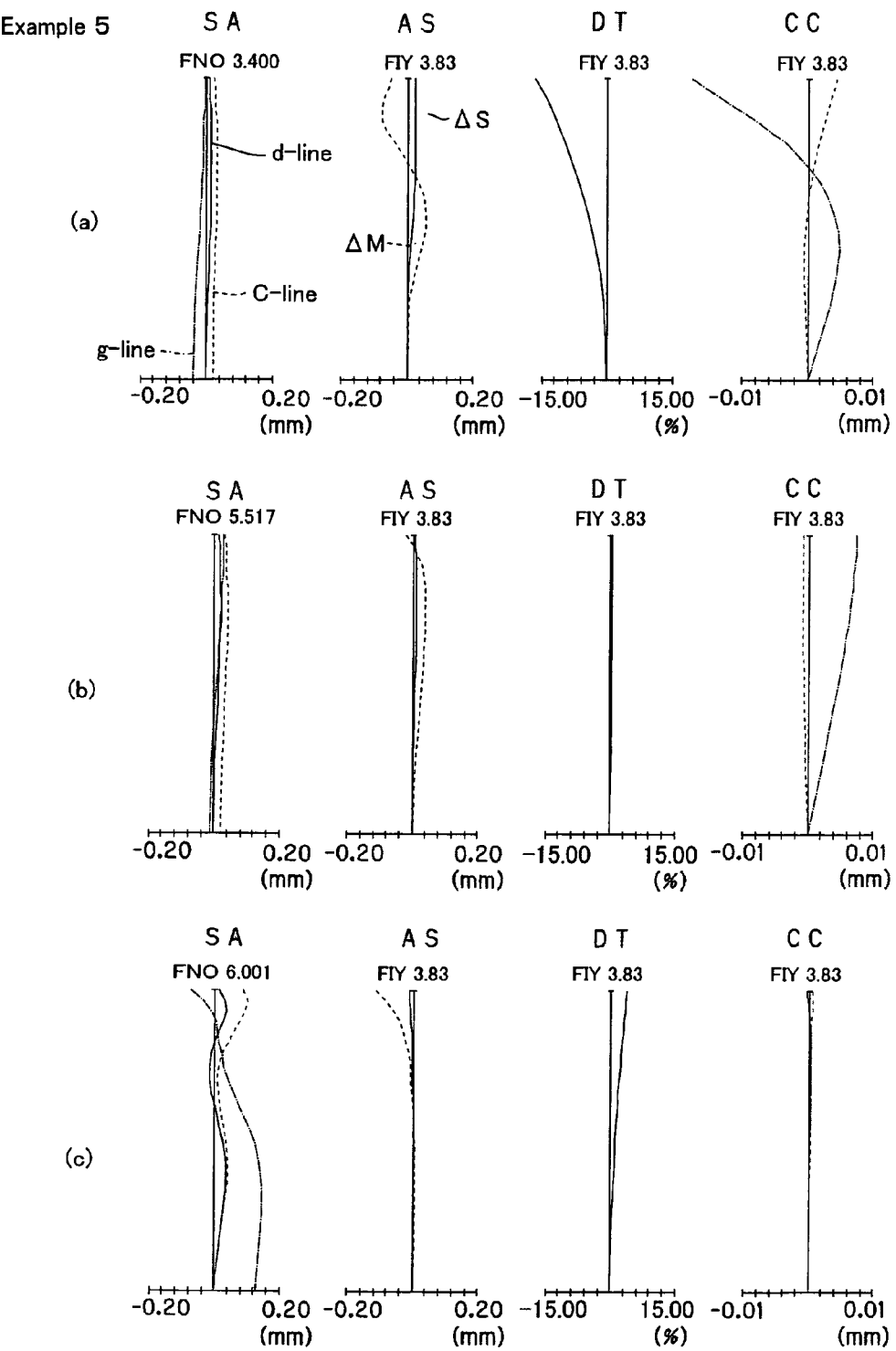
FIGS. 14A to 14C are aberration diagrams for Example 5 upon focusing on an object point at infinity.
Figure 15:
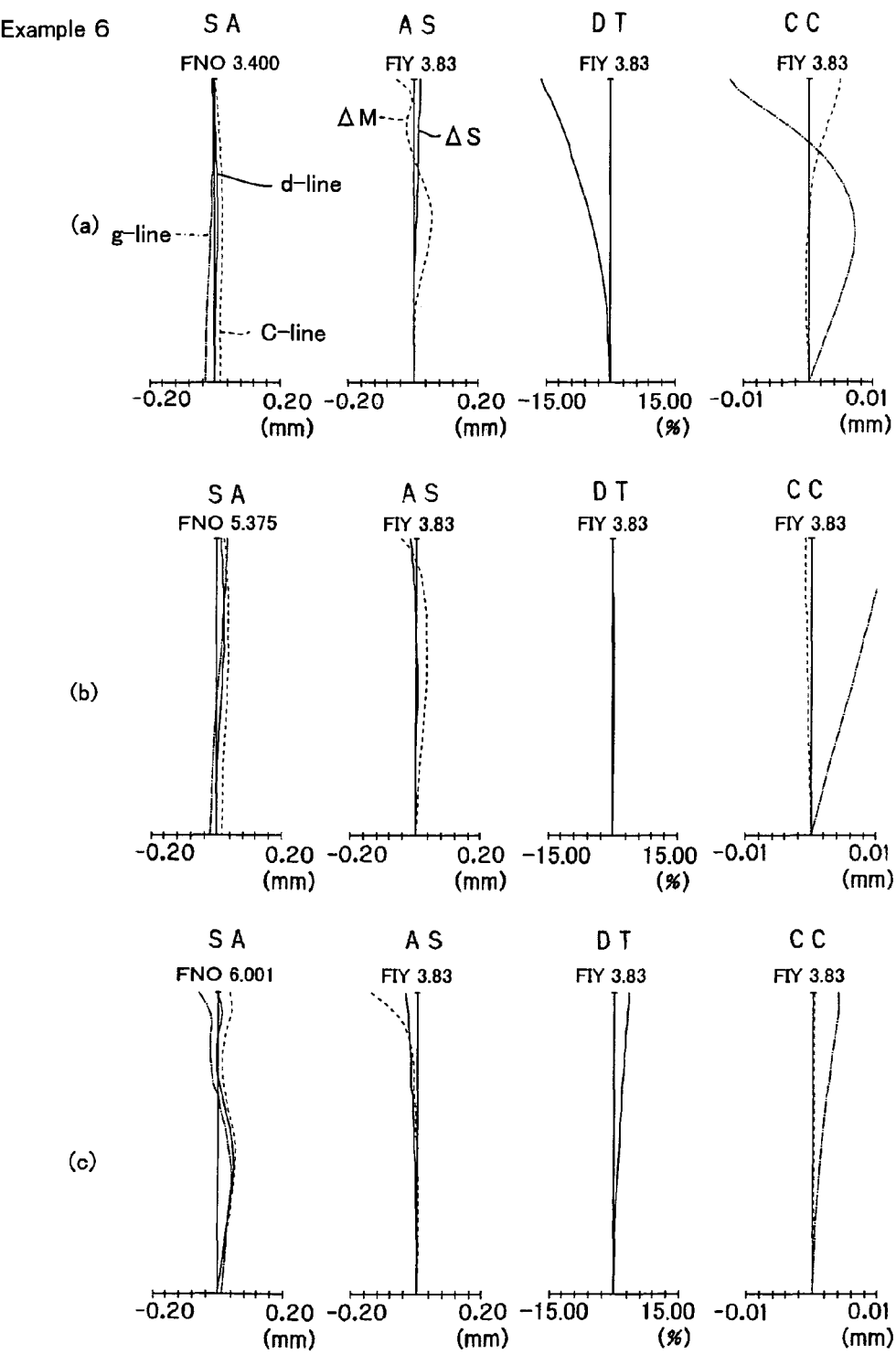
FIGS. 15A to 15C are aberration diagrams for Example 6 upon focusing on an object point at infinity.
Figure 16:
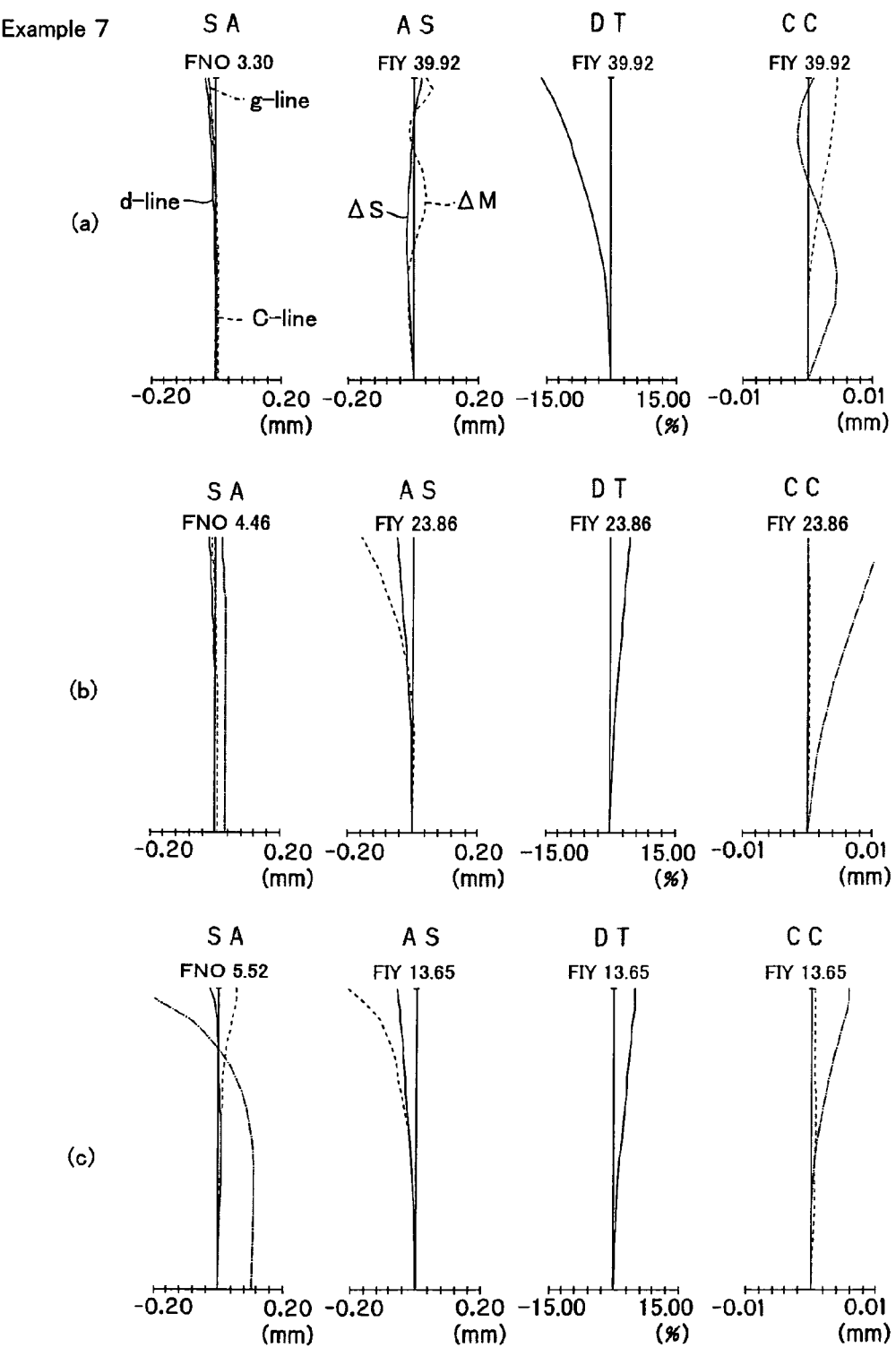
FIGS. 16A to 16C are aberration diagrams for Example 7 upon focusing on an object point at infinity.
Figure 17:
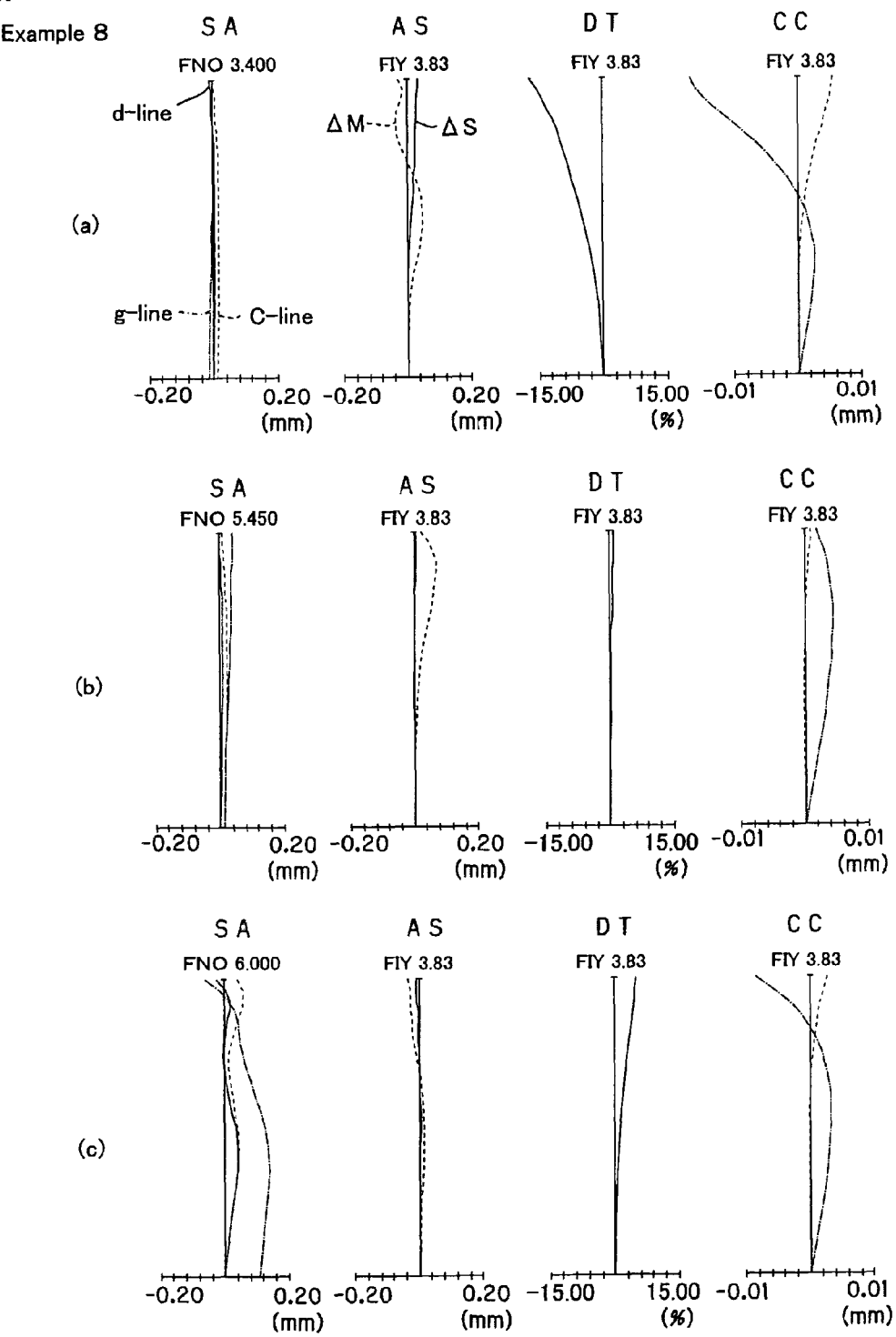
FIGS. 17A to 17C are aberration diagrams for Example 8 upon focusing on an object point at infinity.
Figure 18:
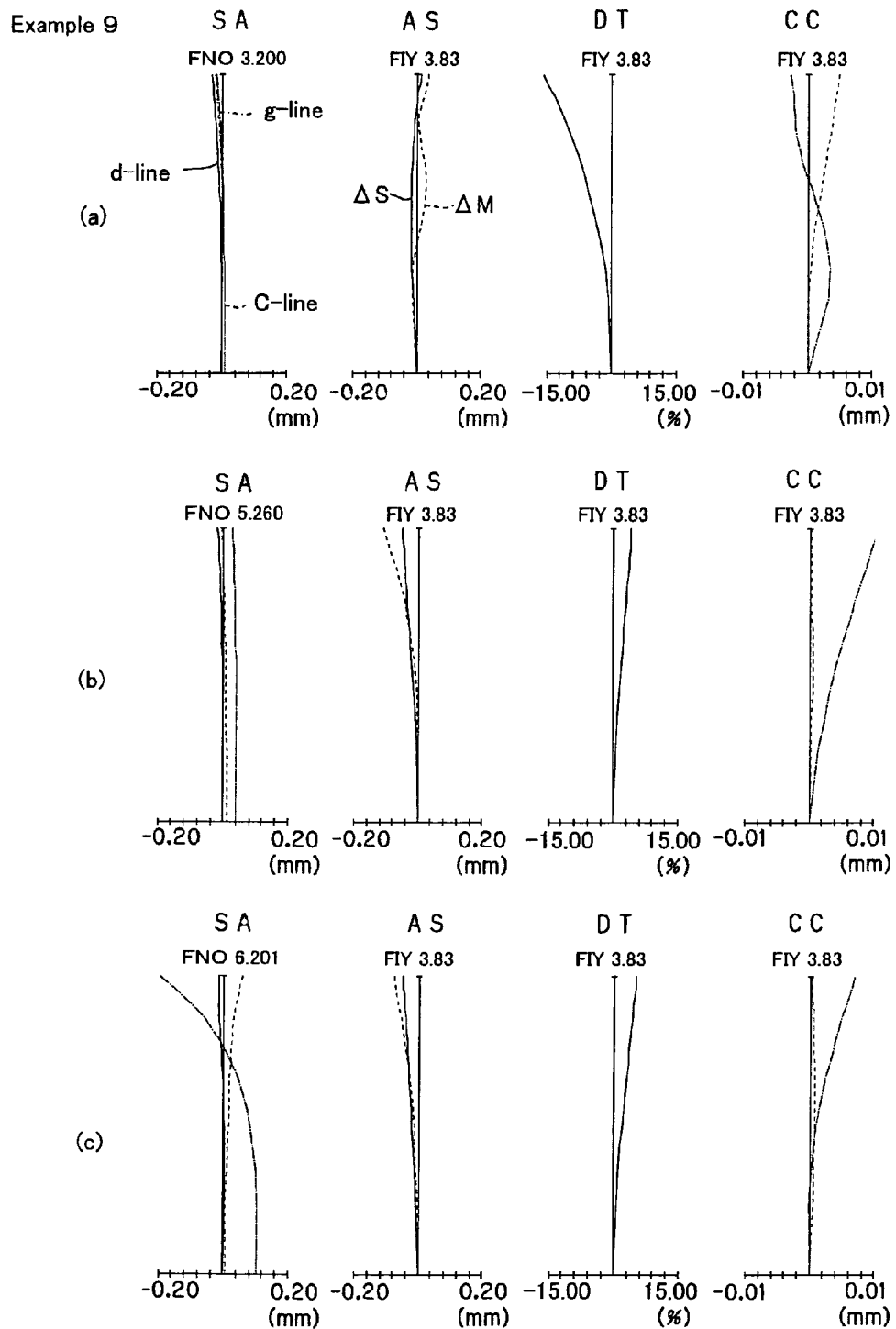
FIGS. 18A to 18C are aberration diagrams for Example 9 upon focusing on an object point at infinity.

As shown in FIG. 9, the zoom lens of Example 9 includes, in order from the object side, the first lens group G1 with a negative refracting power, second lens group G2 with a positive refracting power, aperture stop S, third lens group G3 with a positive refracting power, and fourth lens group G4 with a positive refracting power.

Upon zooming from the wide-angle end to the telephoto end, the respective lens groups move as follows.

The first lens group G1 moves toward the image side from the wide-angle end to the intermediate state and moves toward the object side from the intermediate state to the telephoto end. At the telephoto end, the first lens group G1 is positioned more on the object side than at the wide-angle end.

The second lens group G2 and aperture stop S move in unison toward the object side from the wide-angle end to the telephoto end while the spacing between the first lens group G1 and them becomes narrow and the spacing between the third lens group G3 and them grows wide.

The third lens group G3 moves toward the object side from the wide-angle end to the telephoto end while the spacing between the second lens group G2 and it grows wide and the spacing between the fourth lens group G4 and it grows wide.

The fourth lens group G4 moves toward the object side from the wide-angle end to the intermediate state and moves toward the image side from the intermediate state to the telephoto side. At the telephoto end, the fourth lens group G4 is positioned more on the object side than at the wide-angle end.

In order from the object side, the first lens group G1 is made up of a double-concave negative lens and a positive meniscus lens having a convex surface directed toward the object side; the second lens group G2 is made up of a double-convex positive lens, a cemented lens of a double-convex positive lens and a negative meniscus lens having a convex surface directed toward the image side, an aperture stop S, and a cemented lens of a positive meniscus lens having a convex surface directed toward the object side and a negative meniscus lens having a convex surface directed toward the object side; the third lens group G3 is made up of one planoconvex positive lens having a convex surface directed toward the object side; and the fourth lens group G4 is made up of one positive meniscus lens having a convex surface directed toward the image side.

Seven aspheric surfaces are used: two at both the surfaces of the double-concave negative lens and two at the surfaces of the positive meniscus lens in the first lens group G1; two at both the surfaces of the double-convex positive lens in the second lens group G2; and one at the image side surface of the positive meniscus lens in the fourth lens group G4.

Set out below are the numerical data about the zoom lens of each example.

In the numerical data about the zoom lens in each example, r denotes the radius of curvature of each lens surface, d denotes the thickness of each lens or space between adjoining lens surfaces, nd denotes the d-line refractive index of each lens, vd denotes the d-line Abbe number of each lens, K denotes the conic coefficient, A4, A6, A8, and A10 each denote the aspheric coefficient, and E±N denotes ×10$^{±N}$. Note that values of the image height and angle of view at the wide-angle end are values obtained in the case where electrical correction of distortion is not made. In the case where the distortion is electrically corrected, barrel aberration produced at the wide-angle side is corrected, so that the image height and angle of view at the wide-angle end are changed.

Each aspheric surface is given by the following equation using each aspheric coefficient in each example.

$$Z=(Y^2/r)/[1+\{1-(1+K)\cdot(Y/r)^2\}^{1/2}]+A4\times Y^4+A6\times Y^6+A8\times Y^8+A10\times Y^{10}$$

where Z is the coordinates in the optical axis direction, and Y is the coordinates in the direction vertical to the optical axis.

Numerical Example 1

Unit: mm

Surface data

| Surface No. | r | d | nd | vd |
|---|---|---|---|---|
| 1 (Aspheric surface) | −35.617 | 0.80 | 1.85135 | 40.10 |
| 2 (Aspheric surface) | 6.301 | 1.48 | | |
| 3 (Aspheric surface) | 9.610 | 1.71 | 2.00180 | 19.30 |
| 4 (Aspheric surface) | 22.042 | Variable | | |
| 5 (Flare stop) | ∞ | 0.00 | | |
| 6 (Aspheric surface) | 5.145 | 2.06 | 1.85135 | 40.10 |
| 7 | 14.031 | 0.87 | 2.00069 | 25.46 |
| 8 | 3.875 | 2.23 | 1.62263 | 58.16 |
| 9 (Aspheric surface) | −105.851 | 0.50 | | |
| 10 (Stop) | ∞ | Variable | | |
| 11 | −120.000 | 0.60 | 1.88300 | 40.76 |
| 12 | 20.665 | 2.00 | 1.78590 | 44.20 |
| 13 | −13.109 | Variable | | |
| 14 (Aspheric surface) | −9.800 | 0.90 | 1.52540 | 56.00 |
| 15 (Aspheric surface) | −28.539 | 0.10 | | |
| 16 | ∞ | 0.50 | 1.51633 | 64.14 |
| 17 | ∞ | 0.50 | | |
| 18 | ∞ | 0.50 | 1.51633 | 64.14 |
| 19 | ∞ | 0.37 | | |
| Image surface | ∞ | | | |

Aspheric surface data

1st surface

K = 0.000, A4 = 3.70142E−04, A6 = −5.24195E−06, A8 = 1.62108E−08

2nd surface

K = −2.323, A4 = 5.04960E−04, A6 = 3.38435E−05, A8 = −8.47291E−07, A10 = 1.13025E−08, A12 = −1.90255E−10

3rd surface

K = −1.594, A4 = −5.99201E−04, A6 = 2.51390E−05, A8 = −2.31343E−07

4th surface

K = −1.093, A4 = −5.19246E−04, A6 = 1.32864E−05, A8 = −1.75751E−07

6th surface

K = 0.000, A4 = −1.84377E−04, A6 = 5.16691E−06, A8 = 5.70849E−08

9th surface

K = 0.000, A4 = 1.82713E−03, A6 = 7.76894E−05, A8 = 1.45050E−05

14th surface

K = 0.000, A4 = −1.75207E−03, A6 = 6.55286E−05, A8 = −6.75366E−06, A10 = 3.32586E−07

15th surface

K = 0.000, A4 = 1.00598E−03, A6 = −1.95585E−04, A8 = 6.91879E−06, A10 = −7.38228E−09

Zoom lens data

| | Wide-angle | Intermediate | Telephoto |
|---|---|---|---|
| Focal length | 4.80 | 10.57 | 23.06 |
| F-number | 3.40 | 5.18 | 6.00 |
| Angle of view | 87.77 | 39.23 | 17.98 |
| Image height | 3.83 | 3.83 | 3.83 |
| d4 | 16.26 | 4.88 | 0.15 |
| d10 | 3.56 | 8.19 | 20.43 |
| d13 | 1.91 | 2.72 | 2.81 |
| BF | 1.63 | 1.63 | 1.63 |
| Total lens length | 36.51 | 30.56 | 38.16 |

Data on zoom lens group

| Group | Starting surface | Focal length |
|---|---|---|
| 1 | 1 | −11.33 |
| 2 | 6 | 9.49 |
| 3 | 11 | 20.48 |
| 4 | 14 | −28.89 |

Numerical Example 2

Unit: mm

Surface data

| Surface No. | r | d | nd | vd |
|---|---|---|---|---|
| 1 (Aspheric surface) | −24.021 | 0.85 | 1.85135 | 40.10 |
| 2 (Aspheric surface) | 6.789 | 1.30 | | |
| 3 | 11.146 | 1.80 | 2.00180 | 19.30 |
| 4 | 35.604 | Variable | | |
| 5 (Flare stop) | ∞ | 0.00 | | |
| 6 (Aspheric surface) | 5.070 | 1.50 | 1.85135 | 40.10 |
| 7 | 18.531 | 0.80 | 1.90200 | 25.10 |
| 8 (Aspheric surface) | 4.756 | 0.15 | | |
| 9 | 5.097 | 1.37 | 2.00069 | 25.46 |
| 10 | 4.100 | 1.78 | 1.49700 | 81.54 |
| 11 (Aspheric surface) | −21.272 | 0.50 | | |
| 12 (Stop) | ∞ | Variable | | |
| 13 | −100.000 | 0.60 | 1.88300 | 40.76 |
| 14 | 10.710 | 2.30 | 1.73077 | 40.50 |
| 15 (Aspheric surface) | −10.334 | Variable | | |
| 16 (Aspheric surface) | −10.328 | 0.85 | 1.52540 | 56.00 |
| 17 (Aspheric surface) | −65.108 | 0.10 | | |
| 18 | ∞ | 0.50 | 1.51633 | 64.14 |
| 19 | ∞ | 0.50 | | |
| 20 | ∞ | 0.50 | 1.51633 | 64.14 |
| 21 | ∞ | 0.37 | | |
| Image surface | ∞ | | | |

Aspheric surface data

1st surface

K = 0.000, A4 = 3.45156E−04, A6 = −3.50370E−06, A8 = 4.02690E−09

2nd surface

K = −1.443, A4 = 4.84147E−04, A6 = 6.49666E−06, A8 = −2.30715E−07

-continued

6th surface

K = 0.000, A4 = −1.49080E−04, A6 = 3.64691E−05,
A8 = −1.03068E−06

8th surface

K = 0.000, A4 = 4.38403E−04, A6 = 1.44903E−04, A8 = −2.92305E−06

11th surface

K = 0.000, A4 = 1.43924E−03, A6 = −1.76727E−04, A8 = 2.61305E−05

15th surface

K = 0.000, A4 = 1.50000E−04, A6 = −3.00000E−06

16th surface

K = 0.000, A4 = −1.14290E−03, A6 = −2.67900E−05,
A8 = 1.04245E−06

17th surface

K = 0.000, A4 = 1.85833E−04, A6 = −1.66266E−04, A8 = 1.12858E−05,
A10 = −2.90326E−07

Zoom lens data

| | Wide-angle | Intermediate | Telephoto |
|---|---|---|---|
| Focal length | 4.80 | 10.50 | 23.06 |
| F-number | 3.40 | 5.31 | 6.00 |
| Angle of view | 87.60 | 39.64 | 17.98 |
| Image height | 3.83 | 3.83 | 3.83 |
| d4 | 15.88 | 5.07 | 0.15 |
| d12 | 2.22 | 7.39 | 19.37 |
| d15 | 2.59 | 2.83 | 3.20 |
| BF | 1.63 | 1.63 | 1.63 |
| Total lens length | 36.13 | 30.73 | 38.16 |

Data on zoom lens group

| Group | Starting surface | Focal length |
|---|---|---|
| 1 | 1 | −11.31 |
| 2 | 6 | 9.45 |
| 3 | 13 | 20.00 |
| 4 | 16 | −23.49 |

Numerical Example 3

Unit: mm

Surface data

| Surface No. | r | d | nd | vd |
|---|---|---|---|---|
| 1 (Aspheric surface) | −25.659 | 0.85 | 1.85135 | 40.10 |
| 2 (Aspheric surface) | 6.608 | 1.30 | | |
| 3 | 10.971 | 1.80 | 2.00180 | 19.30 |
| 4 | 33.981 | Variable | | |
| 5 (Flare stop) | ∞ | 0.00 | | |
| 6 (Aspheric surface) | 5.024 | 1.50 | 1.85135 | 40.10 |
| 7 | 17.751 | 0.80 | 1.90200 | 25.10 |
| 8 (Aspheric surface) | 5.552 | 0.30 | | |
| 9 | 5.958 | 1.37 | 2.00069 | 25.46 |
| 10 | 4.100 | 1.78 | 1.49700 | 81.54 |
| 11 (Aspheric surface) | −20.830 | 0.50 | | |
| 12 (Stop) | ∞ | Variable | | |
| 13 | −100.000 | 0.60 | 1.88300 | 40.76 |
| 14 | 10.710 | 2.30 | 1.73077 | 40.50 |
| 15 (Aspheric surface) | −10.334 | Variable | | |
| 16 (Aspheric surface) | −9.800 | 0.85 | 1.49700 | 81.61 |
| 17 (Aspheric surface) | −136.225 | 0.10 | | |
| 18 | ∞ | 0.50 | 1.51633 | 64.14 |
| 19 | ∞ | 0.50 | | |
| 20 | ∞ | 0.50 | 1.51633 | 64.14 |
| 21 | ∞ | 0.37 | | |
| Image surface | ∞ | | | |

Aspheric surface data

1st surface

K = 0.000, A4 = 3.02648E−04, A6 = −3.02179E−06, A8 = 2.06812E−09

2nd surface

K = −1.555, A4 = 5.08575E−04, A6 = 5.85690E−06,
A8 = −2.18104E−07

6th surface

K = 0.000, A4 = −5.83771E−05, A6 = 3.77259E−05,
A8 = −2.06600E−08

8th surface

K = 0.000, A4 = 7.80955E−04, A6 = 1.45798E−04, A8 = 2.57057E−06

11th surface

K = 0.000, A4 = 1.19953E−03, A6 = −1.82907E−04, A8 = 2.51404E−05

15th surface

K = 0.000, A4 = 1.50000E−04, A6 = −3.00000E−06

16th surface

K = 0.000, A4 = −1.12047E−03, A6 = −3.12468E−05,
A8 = 1.30368E−06

17th surface

K = 0.000, A4 = 1.85833E−04, A6 = −1.66266E−04, A8 = 1.12858E−05,
A10 = −2.90326E−07

Zoom lens data

| | Wide-angle | Intermediate | Telephoto |
|---|---|---|---|
| Focal length | 4.80 | 10.50 | 23.06 |
| F-number | 3.40 | 5.33 | 6.00 |
| Angle of view | 87.60 | 39.64 | 17.98 |
| Image height | 3.83 | 3.83 | 3.83 |
| d4 | 15.81 | 5.04 | 0.15 |
| d12 | 2.15 | 7.27 | 19.23 |
| d15 | 2.54 | 2.80 | 3.20 |
| BF | 1.63 | 1.63 | 1.63 |
| Total lens length | 36.08 | 30.70 | 38.16 |

Data on zoom lens group

| Group | Starting surface | Focal length |
|---|---|---|
| 1 | 1 | −11.19 |
| 2 | 6 | 9.41 |
| 3 | 13 | 20.00 |
| 4 | 16 | −21.29 |

Numerical Example 4

Unit: mm

Surface data

| Surface No. | r | d | nd | vd |
|---|---|---|---|---|
| 1 (Aspheric surface) | −33.477 | 0.85 | 1.85135 | 40.10 |
| 2 (Aspheric surface) | 6.176 | 1.30 | | |
| 3 | 10.359 | 1.80 | 2.00180 | 19.30 |
| 4 | 29.108 | Variable | | |
| 5 (Flare stop) | ∞ | 0.00 | | |
| 6 (Aspheric surface) | 4.947 | 1.50 | 1.85135 | 40.10 |
| 7 | 21.566 | 0.80 | 1.90200 | 25.10 |

-continued

| | | | | |
|---|---|---|---|---|
| 8 (Aspheric surface) | 6.291 | 0.30 | | |
| 9 | 6.686 | 1.46 | 2.00069 | 25.46 |
| 10 | 4.056 | 1.70 | 1.49700 | 81.54 |
| 11 (Aspheric surface) | −23.182 | 0.50 | | |
| 12 (Stop) | ∞ | Variable | | |
| 13 (Aspheric surface) | −100.000 | 3.02 | 1.80440 | 39.59 |
| 14 (Aspheric surface) | −14.045 | Variable | | |
| 15 (Aspheric surface) | −9.800 | 0.85 | 1.49700 | 81.61 |
| 16 (Aspheric surface) | −69.166 | 0.10 | | |
| 17 | ∞ | 0.50 | 1.51633 | 64.14 |
| 18 | ∞ | 0.50 | | |
| 19 | ∞ | 0.50 | 1.51633 | 64.14 |
| 20 | ∞ | 0.37 | | |
| Image surface | ∞ | | | |

Aspheric surface data

1st surface

K = 0.000, A4 = 2.26556E−04, A6 = −2.18462E−06, A8 = 3.61581E−11
2nd surface

K = −1.303, A4 = 3.96923E−04, A6 = 7.35544E−06,
A8 = −2.18655E−07
6th surface

K = 0.000, A4 = −8.64620E−05, A6 = 3.83219E−05, A8 = 8.35946E−07
8th surface

K = 0.000, A4 = 7.98456E−04, A6 = 1.48016E−04, A8 = 5.27245E−06
11th surface

K = 0.000, A4 = 1.38587E−03, A6 = −2.08311E−04, A8 = 3.36686E−05
13th surface

K = 0.000, A4 = 8.52767E−05, A6 = 2.27730E−07, A8 = 2.01575E−07,
A10 = −8.87672E−09
14th surface K = 0.000, A4 = 1.50000E−04, A6 = −3.00000E−06
15th surface K = 0.000, A4 = −5.55867E−04, A6 = −5.89059E−05,
A8 = 1.54365E−06
16th surface K = 0.000, A4 = 1.85833E−04, A6 = −1.66266E−04, A8 = 1.12858E−05,
A10 = −2.90326E−07

Zoom lens data

| | Wide-angle | Intermediate | Telephoto |
|---|---|---|---|
| Focal length | 4.80 | 10.50 | 23.06 |
| F-number | 3.40 | 5.41 | 6.00 |
| Angle of view | 87.30 | 40.09 | 18.28 |
| Image height | 3.83 | 3.83 | 3.83 |
| d4 | 15.10 | 4.94 | 0.15 |
| d12 | 1.83 | 7.20 | 19.11 |
| d14 | 2.44 | 2.51 | 3.20 |
| BF | 1.63 | 1.63 | 1.63 |
| Total lens length | 35.07 | 30.35 | 38.16 |

Data on zoom lens group

| Group | Starting surface | Focal length |
|---|---|---|
| 1 | 1 | −11.12 |
| 2 | 6 | 9.25 |
| 3 | 13 | 20.00 |
| 4 | 15 | −23.08 |

Numerical Example 5

Unit: mm

Surface data

| Surface No. | r | d | nd | νd |
|---|---|---|---|---|
| 1 (Aspheric surface) | −35.375 | 0.85 | 1.85135 | 40.10 |
| 2 (Aspheric surface) | 6.288 | 1.50 | | |
| 3 | 10.892 | 1.80 | 2.50000 | 19.60 |
| 4 | 17.744 | Variable | | |
| 5 (Flare stop) | ∞ | 0.00 | | |
| 6 (Aspheric surface) | 5.033 | 1.50 | 1.85135 | 40.10 |
| 7 | 21.321 | 0.80 | 1.90200 | 25.10 |
| 8 (Aspheric surface) | 6.814 | 0.30 | | |
| 9 | 6.683 | 1.58 | 2.00069 | 25.46 |
| 10 | 3.900 | 1.80 | 1.49700 | 81.54 |
| 11 (Aspheric surface) | −21.043 | 0.50 | | |
| 12 (Stop) | ∞ | Variable | | |
| 13 (Aspheric surface) | −100.000 | 3.02 | 1.80440 | 39.59 |
| 14 (Aspheric surface) | −14.045 | Variable | | |
| 15 (Aspheric surface) | −9.800 | 0.85 | 1.49700 | 81.61 |
| 16 (Aspheric surface) | −57.344 | 0.10 | | |
| 17 | ∞ | 0.50 | 1.51633 | 64.14 |
| 18 | ∞ | 0.50 | | |
| 19 | ∞ | 0.50 | 1.51633 | 64.14 |
| 20 | ∞ | 0.37 | | |
| Image surface | ∞ | | | |

Aspheric surface data

1st surface

K = 0.000, A4 = 2.31021E−04, A6 = −2.23951E−06, A8 = 5.23239E−10
2nd surface

K = −1.201, A4 = 3.40112E−04, A6 = 8.65082E−06,
A8 = −2.26912E−07
6th surface

K = 0.000, A4 = −2.80015E−05, A6 = 4.17046E−05, A8 = 1.26993E−06
8th surface

K = 0.000, A4 = 9.94918E−04, A6 = 1.42001E−04, A8 = 7.99058E−06
11th surface

K = 0.000, A4 = 1.08620E−03, A6 = −2.60891E−04, A8 = 2.94848E−05
13th surface

K = 0.000, A4 = 9.47444E−05, A6 = 1.94588E−06, A8 = 1.67866E−07,
A10 = −9.17638E−09
14th surface K = 0.000, A4 = 1.50000E−04, A6 = −3.00000E−06
15th surface K = 0.000, A4 = −8.32364E−04, A6 = −8.82701E−05,
A8 = 2.18968E−06
16th surface K = 0.000, A4 = −5.77585E−05, A6 = −1.78396E−04,
A8 = 1.08789E−05,
A10 = −2.68616E−07

Zoom lens data

| | Wide-angle | Intermediate | Telephoto |
|---|---|---|---|
| Focal length | 4.80 | 10.50 | 23.06 |
| F-number | 3.40 | 5.52 | 6.00 |
| Angle of view | 87.58 | 39.99 | 18.22 |
| Image height | 3.83 | 3.83 | 3.83 |
| d4 | 14.05 | 4.69 | 0.15 |
| d12 | 1.61 | 7.04 | 18.69 |

-continued

| | | | |
|---|---|---|---|
| d14 | 2.28 | 2.23 | 3.20 |
| BF | 1.63 | 1.63 | 1.63 |
| Total lens length | 34.06 | 30.08 | 38.16 |

Data on zoom lens group

| Group | Starting surface | Focal length |
|---|---|---|
| 1 | 1 | −10.68 |
| 2 | 6 | 8.86 |
| 3 | 13 | 20.00 |
| 4 | 15 | −23.92 |

Numerical Example 6

Unit: mm

Surface data

| Surface No. | r | d | nd | vd |
|---|---|---|---|---|
| 1 (Aspheric surface) | −27.217 | 0.85 | 1.85135 | 40.10 |
| 2 (Aspheric surface) | 6.523 | 1.30 | | |
| 3 | 10.560 | 1.80 | 2.00180 | 19.30 |
| 4 | 30.216 | Variable | | |
| 5 (Flare stop) | ∞ | 0.00 | | |
| 6 (Aspheric surface) | 5.203 | 1.50 | 1.85135 | 40.10 |
| 7 | 17.507 | 0.80 | 1.90200 | 25.10 |
| 8 (Aspheric surface) | 4.446 | 0.30 | 1.51556 | 37.55 |
| 9 | 4.730 | 1.37 | 2.00069 | 25.46 |
| 10 | 4.100 | 1.78 | 1.49700 | 81.54 |
| 11 (Aspheric surface) | −23.372 | 0.50 | | |
| 12 (Stop) | ∞ | Variable | | |
| 13 | −285.731 | 0.60 | 1.88300 | 40.76 |
| 14 | 10.710 | 2.30 | 1.73077 | 40.50 |
| 15 (Aspheric surface) | −10.510 | Variable | | |
| 16 (Aspheric surface) | −9.800 | 0.85 | 1.52540 | 56.00 |
| 17 (Aspheric surface) | −546.836 | 0.10 | | |
| 18 | ∞ | 0.50 | 1.51633 | 64.14 |
| 19 | ∞ | 0.50 | | |
| 20 | ∞ | 0.50 | 1.51633 | 64.14 |
| 21 | ∞ | 0.37 | | |
| Image surface | ∞ | | | |

Aspheric surface data

1st surface

K = 0.000, A4 = 3.30260E−04, A6 = −3.47614E−06, A8 = 6.43003E−09
2nd surface

K = −1.019, A4 = 3.44903E−04, A6 = 7.53971E−06,
A8 = −2.31782E−07
6th surface

K = 0.000, A4 = −1.77953E−04, A6 = 3.19308E−05,
A8 = −9.46289E−07
8th surface

K = 0.000, A4 = 8.31722E−04, A6 = 2.66723E−04, A8 = 8.90542E−08
11th surface

K = 0.000, A4 = 1.69449E−03, A6 = −1.72052E−04, A8 = 3.28635E−05
15th surface

K = 0.000, A4 = 1.50000E−04, A6 = −3.00000E−06
16th surface

K = 0.000, A4 = −5.71029E−04, A6 = −5.10945E−05,
A8 = 1.85733E−06

17th surface

K = 0.000, A4 = 1.85833E−04, A6 = −1.66266E−04, A8 = 1.12858E−05,
A10 = −2.90326E−07

Zoom lens data

| | Wide-angle | Intermediate | Telephoto |
|---|---|---|---|
| Focal length | 4.80 | 10.50 | 23.06 |
| F-number | 3.40 | 5.37 | 6.00 |
| Angle of view | 87.31 | 40.09 | 18.25 |
| Image height | 3.83 | 3.83 | 3.83 |
| d4 | 15.48 | 5.08 | 0.15 |
| d12 | 2.07 | 7.40 | 19.22 |
| d15 | 2.41 | 2.47 | 3.20 |
| BF | 1.63 | 1.63 | 1.63 |
| Total lens length | 35.54 | 30.53 | 38.16 |

Data on zoom lens group

| Group | Starting surface | Focal length |
|---|---|---|
| 1 | 1 | −11.19 |
| 2 | 6 | 9.31 |
| 3 | 13 | 18.56 |
| 4 | 16 | −19.00 |

Numerical Example 7

Unit: mm

Surface data

| Surface No. | r | d | nd | vd |
|---|---|---|---|---|
| 1 (Aspheric surface) | −26.329 | 0.70 | 1.85135 | 40.10 |
| 2 (Aspheric surface) | 6.960 | 2.11 | | |
| 3 (Aspheric surface) | 12.021 | 1.90 | 2.00170 | 20.64 |
| 4 (Aspheric surface) | 40.952 | Variable | | |
| 5 (Aspheric surface) | 21.546 | 1.40 | 1.51823 | 58.90 |
| 6 | −183.546 | 1.00 | 1.49700 | 81.54 |
| 7 (Aspheric surface) | −80.587 | 0.10 | | |
| 8 | 9.967 | 2.50 | 1.49700 | 81.54 |
| 9 | −12.102 | 0.10 | | |
| 10 (Stop) | ∞ | 0.00 | | |
| 11 | 6.460 | 1.90 | 1.78339 | 43.13 |
| 12 | 234.538 | 0.55 | 2.00330 | 28.27 |
| 13 | 4.331 | 1.65 | | |
| 14 (Flare stop) | ∞ | Variable | | |
| 15 | 980.000 | 0.70 | 1.51633 | 64.14 |
| 16 | −498.410 | Variable | | |
| 17 | −60.001 | 1.70 | 1.85135 | 40.10 |
| 18 (Aspheric surface) | −10.778 | Variable | | |
| 19 | ∞ | 0.50 | 1.53996 | 59.45 |
| 20 | ∞ | 0.50 | | |
| 21 | ∞ | 0.49 | 1.51633 | 64.14 |
| 22 | ∞ | 0.36 | | |
| Image surface | ∞ | | | |

Aspheric surface data

1st surface

K = 0.000, A4 = 3.51470E−04, A6 = −3.25497E−06, A8 = 7.30680E−09
2nd surface

K = −1.885, A4 = 3.00354E−04, A6 = 1.10845E−05,
A8 = −9.85947E−08, A10 = −1.23962E−09
3rd surface

K = 0.000, A4 = −2.52283E−04, A6 = 2.36083E−06, A8 = 1.29035E−08

-continued

4th surface

K = 0.000, A4 = −7.59241E−05, A6 = −5.72730E−07,
A8 = 1.06666E−08
5th surface

K = 0.000, A4 = −5.39083E−04, A6 = −9.86756E−06,
A8 = 3.68451E−07
7th surface

K = 0.000, A4 = −1.36352E−04, A6 = −5.62108E−06,
A8 = 4.58369E−07
18th surface

K = 0.000, A4 = 6.44682E−04, A6 = −1.59264E−05, A8 = 5.12936E−07,
A10 = −9.03081E−09

Zoom lens data

|  | Wide-angle | Intermediate | Telephoto |
|---|---|---|---|
| Focal length | 4.49 | 11.50 | 25.90 |
| F-number | 3.20 | 5.23 | 6.00 |
| Angle of view | 91.03 | 35.40 | 16.05 |
| Image height | 3.83 | 3.83 | 3.83 |
| d4 | 21.55 | 5.90 | 0.75 |
| d14 | 0.79 | 3.10 | 12.93 |
| d16 | 2.92 | 8.40 | 15.57 |
| d18 | 2.00 | 2.39 | 2.10 |
| BF | 3.51 | 3.89 | 3.60 |
| Total lens length | 45.08 | 37.60 | 49.16 |

Data on zoom lens group

| Group | Starting surface | Focal length |
|---|---|---|
| 1 | 1 | −12.79 |
| 2 | 5 | 11.39 |
| 3 | 15 | 639.97 |
| 4 | 17 | 15.19 |

Numerical Example 8

Unit: mm

Surface data

| Surface No. | r | d | nd | vd |
|---|---|---|---|---|
| 1 (Aspheric surface) | −35.337 | 0.85 | 1.85135 | 40.10 |
| 2 (Aspheric surface) | 6.306 | 1.50 | | |
| 3 | 10.904 | 1.80 | 2.50000 | 19.60 |
| 4 | 18.125 | Variable | | |
| 5 (Flare stop) | ∞ | 0.00 | | |
| 6 (Aspheric surface) | 5.116 | 1.50 | 1.85135 | 40.10 |
| 7 | 11.394 | 0.80 | 1.90200 | 25.10 |
| 8 (Aspheric surface) | 7.400 | 0.30 | | |
| 9 | 7.610 | 1.07 | 2.00069 | 25.46 |
| 10 | 3.900 | 1.80 | 1.49700 | 81.54 |
| 11 (Aspheric surface) | −15.198 | 0.50 | | |
| 12 (Stop) | ∞ | Variable | | |
| 13 (Aspheric surface) | −13.012 | 0.80 | 1.85000 | 32.40 |
| 14 | 32.137 | 0.48 | | |
| 15 | 12.977 | 2.42 | 1.80440 | 39.59 |
| 16 (Aspheric surface) | −10.107 | Variable | | |
| 17 (Aspheric surface) | −7.000 | 0.85 | 1.49700 | 81.61 |
| 18 (Aspheric surface) | −21.162 | 0.10 | | |
| 19 | ∞ | 0.50 | 1.51633 | 64.14 |
| 20 | ∞ | 0.50 | | |
| 21 | ∞ | 0.50 | 1.51633 | 64.14 |
| 22 | ∞ | 0.37 | | |
| Image surface | ∞ | | | |

-continued

Aspheric surface data

1st surface

K = 0.000, A = 2.30462E−04, A6 = −2.32974E−06, A8 = −4.19826E−10
2nd surface

K = −1.139, A4 = 3.53617E−04, A6 = 5.77702E−06,
A8 = −2.02136E−07
6th surface

K = 0.000, A4 = 5.42425E−07, A6 = 3.28207E−05, A8 = 1.17839E−06
8th surface

K = 0.000, A4 = 9.21096E−04, A6 = 1.24749E−04, A8 = 5.68482E−06
11th surface

K = 0.000, A4 = 5.71317E−04, A6 = −1.54560E−04, A8 = 1.62938E−05
13th surface

K = 0.000, A4 = −1.04005E−04, A6 = 4.87637E−06, A8 = 8.26710E−07,
A10 = −6.64788E−08
16th surface K = 0.000, A4 = 1.50000E−04, A6 = −3.00000E−06
17th surface K = 0.000, A4 = −6.95258E−04, A6 = −1.67444E−04,
A8 = 4.54491E−06
18th surface K0.000, A4 = −5.77585E−05, A6 = −1.78396E−04, A8 = 1.08789E−05,
A10 = −2.68616E−07

Zoom lens data

|  | Wide-angle | Intermediate | Telephoto |
|---|---|---|---|
| Focal length | 4.80 | 10.50 | 23.06 |
| F-number | 3.40 | 5.45 | 6.00 |
| Angle of view | 87.83 | 39.78 | 17.97 |
| Image height | 3.83 | 3.83 | 3.83 |
| d4 | 14.79 | 5.23 | 0.60 |
| d12 | 1.04 | 7.19 | 19.57 |
| d16 | 3.72 | 3.31 | 3.20 |
| BF | 1.63 | 1.63 | 1.63 |
| Total lens length | 35.84 | 32.03 | 39.66 |

Data on zoom lens group

| Group | Starting surface | Focal length |
|---|---|---|
| 1 | 1 | −10.95 |
| 2 | 6 | 9.42 |
| 3 | 13 | 16.10 |
| 4 | 17 | −21.47 |

Numerical Example 9

Unit: mm

Surface data

| Surface No. | r | d | nd | vd |
|---|---|---|---|---|
| 1 (Aspheric surface) | −26.746 | 0.70 | 1.85135 | 40.10 |
| 2 (Aspheric surface) | 6.857 | 2.11 | | |
| 3 (Aspheric surface) | 12.197 | 1.90 | 2.00170 | 20.64 |
| 4 (Aspheric surface) | 43.577 | Variable | | |
| 5 (Aspheric surface) | 14.064 | 1.40 | 1.51823 | 58.90 |
| 6 (Aspheric surface) | −57.026 | 0.10 | | |
| 7 | 15.777 | 2.50 | 1.49700 | 81.54 |
| 8 | −10.362 | 1.20 | 1.62588 | 35.70 |

-continued

| | | | | |
|---|---|---|---|---|
| 9 | −12.343 | 0.10 | | |
| 10 (Stop) | ∞ | 0.00 | | |
| 11 | 6.801 | 1.90 | 1.79952 | 42.22 |
| 12 | 234.538 | 0.55 | 2.00330 | 28.27 |
| 13 | 4.685 | 1.65 | | |
| 14 (Flare stop) | ∞ | Variable | | |
| 15 | 600.000 | 0.70 | 1.51633 | 64.14 |
| 16 | ∞ | Variable | | |
| 17 | −34.900 | 1.70 | 1.85135 | 40.10 |
| 18 (Aspheric surface) | −9.539 | Variable | | |
| 19 | ∞ | 0.50 | 1.53996 | 59.45 |
| 20 | ∞ | 0.50 | | |
| 21 | ∞ | 0.49 | 1.51633 | 64.14 |
| 22 | ∞ | 0.36 | | |
| Image surface | ∞ | | | |

Aspheric surface data

1st surface

K = 0.000, A4 = 3.14960E−04, A6 = −3.38727E−06, A8 = 1.16085E−08

2nd surface

K = −1.718, A4 = 2.83817E−04, A6 = 1.00124E−05,
A8 = −1.38721E−07, A10 = −2.60020E−10

3rd surface

K = 0.000, A4 = −2.52283E−04, A6 = 2.36083E−06, A8 = 1.29035E−08

4th surface

K = 0.000, A4 = −1.04975E−04, A6 = −2.98634E−07,
A8 = 1.18064E−08

5th surface

K = 0.000, A4 = −4.49168E−04, A6 = −1.35739E−05,
A8 = −5.38008E−08

6th surface

K = 0.000, A4 = −1.47489E−04, A6 = −1.25773E−05,
A8 = 3.54315E−08

18th surface

K = 0.000, A4 = 6.93690E−04, A6 = −1.10448E−05, A8 = 1.80457E−07,
A10 = −9.78383E−10

Zoom lens data

| | Wide-angle | Intermediate | Telephoto |
|---|---|---|---|
| Focal length | 4.66 | 11.60 | 24.90 |
| F-number | 3.20 | 5.26 | 6.20 |
| Angle of view | 88.79 | 35.16 | 16.65 |
| Image height | 3.83 | 3.83 | 3.83 |
| d4 | 21.58 | 6.62 | 1.50 |
| d14 | 0.67 | 2.56 | 12.98 |
| d16 | 3.23 | 9.30 | 14.66 |
| d18 | 2.00 | 2.22 | 2.10 |
| BF | 3.51 | 3.72 | 3.60 |
| Total lens length | 45.89 | 39.11 | 49.66 |

Data on zoom lens group

| Group | Starting surface | Focal length |
|---|---|---|
| 1 | 1 | −12.66 |
| 2 | 5 | 11.57 |
| 3 | 15 | 1162.05 |
| 4 | 17 | 14.96 |

FIGS. 10 to 18 are aberration diagrams for Examples 1 to 9 upon focusing on an object point at infinity. In these aberration diagrams, (a), (b) and (c) are indicative of spherical aberrations SA, astigmatism AS, distortion DT and chromatic aberration of magnification CC at the wide-angle end, in the intermediate state, and at the telephoto end, respectively.

Set out below are the values of conditional expressions (1) to (7) and image height and angle of view at the wide-angle end after distortion correction in the above Examples.

| Conditional expression | Example 1 | Example 2 | Example 3 | Example 4 | Example 5 |
|---|---|---|---|---|---|
| (1) | 1.073 | 1.166 | 1.197 | 0.19 | 0.19 |
| (2) | 0.701 | 0.908 | 0.904 | 0.980 | 0.914 |
| (3) | 2 | 2 | 2 | 2 | 2 |
| (4) | 0.308 | 0.271 | 0.271 | 0.271 | 0.313 |
| (5) | 0.699 | 0.559 | 0.590 | 0.689 | 0.698 |
| (6) | 1.299 | 1.994 | 1.951 | 1.873 | 1.519 |
| (7) | 1.927 | 1.927 | 1.927 | 1.927 | 2.176 |
| Image height after correction | 3.44 | 3.45 | 3.45 | 3.45 | 3.45 |
| Angle of view after correction | 78.9 | 78.9 | 78.9 | 78.9 | 78.9 |

| Conditional expression | Example 6 | Example 7 | Example 8 | Example 9 |
|---|---|---|---|---|
| (1) | 1.197 | 1.681 | 1.140 | 1.750 |
| (2) | 0.871 | 0.227 | 0.656 | 0.396 |
| (3) | 4 | 2 | 2 | 2 |
| (4) | 0.271 | 0.448 | 0.361 | 0.448 |
| (5) | 0.613 | 0.582 | 0.697 | 0.592 |
| (6) | 1.857 | 1.385 | 2.479 | 1.531 |
| (7) | 1.927 | 1.927 | 2.176 | 1.927 |
| Image height after correction | 3.45 | 3.46 | 3.44 | 3.46 |
| Angle of view after correction | 78.9 | 82.6 | 78.9 | 80.6 |

Each example may further be modified as follows.

In the zoom lens of each example, barrel distortion is produced on the rectangular photoelectric transformation plane at the wide-angle end, while the occurrence of distortion is hold back near an intermediate focal length or at the telephoto end. For electrical correction of distortion, the effective imaging area should preferably be configured into barrel form at the wide-angle end and rectangular form near the intermediate focal length or at the telephoto end. The predetermined effective imaging area is converted by image processing into rectangular image information with reduced distortion. The image height IHw at the wide-angle end is lower than the image height IHs at the intermediate focal length state or image height IHt at the telephoto end.

Figure 19:
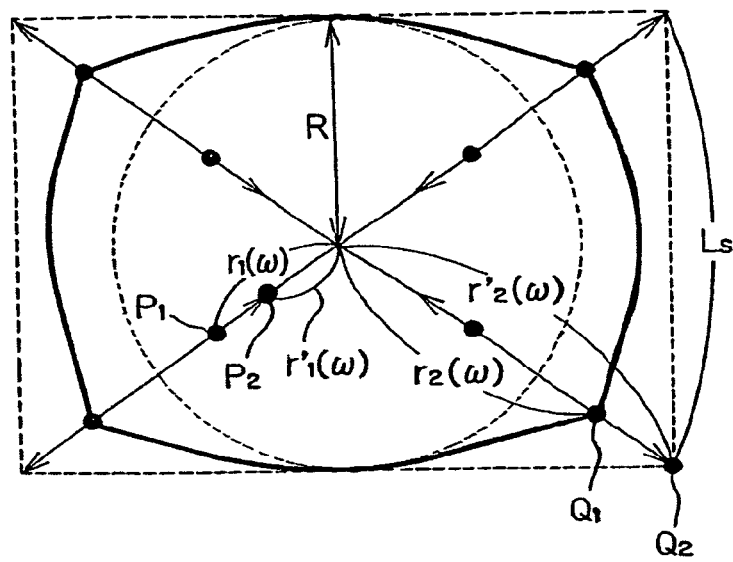
FIG. 19 is a view showing distortion correction.

As shown in FIG. 19, the magnification on a circle (image height) of a radius R, with an intersection of the optical axis and the imaging surface as a center, coming into contact with the major sides of the effective imaging surface is made constant and this circle is used as a reference of correction. Individual points on circles (image heights) of given radii r ($\omega$) other than the radius R are almost radially moved. In this case, the individual points are moved concentrically so that the radii r (w) become radii r' ($\omega$). By doing so, the image distortion is corrected.

In FIG. 19, for example, a point $P_1$ on the circle of a given radius $r_1$ ($\omega$) located inside the circle of the radius R is moved to a point $P_2$ on the circle of a radius $r_1'$ ($\omega$) to be corrected toward the center of the circle. A point $Q_1$ on the circle of a given radius $r_2$ ($\omega$) located outside the circle of the radius R is moved to a point $Q_2$ on the circle of a radius $r_2'$ ($\omega$) to be corrected in a direction separating from the center of the circle. Here, the radius r' ($\omega$) can be expressed as follows:

$$r'(\omega) = \alpha f \tan \omega \, (0 \leq \alpha \leq 1)$$

where $\omega$ is half field angle of an object and f is focal length of an imaging optical system (the zoom lens in the present invention).

Here, assuming that an ideal image height corresponding to a point on the circle (the image height) of the radius R is represented by Y, the following relation is obtained:

$$\alpha = R/Y = R/f \tan \omega$$

Ideally, the optical system is rotationally symmetrical about the optical axis. Hence, the distortion is also produced rotationally symmetrical about the optical axis. Thus, when distortion optically produced is electrically corrected as described above, the magnification on the circle (the image height) of the radius R, with an intersection of the optical axis and the imaging surface as a center, coming into contact with the major sides of the effective imaging surface is made constant on a reproduced image. Then, individual points on the circles (image heights) of the radii r ($\omega$) other than the radius R are almost radially moved. In this case, the individual points are moved concentrically so that the radii r ($\omega$) become the radii r' ($\omega$). By doing so, when the image distortion can be corrected, it is considered to be advantageous for amounts of data and calculation.

However, an optical image, when picked up by the electronic imaging device, ceases to be continuous (for sampling). Strictly speaking, therefore, unless the pixels of the electronic imaging device are radially arrayed, the circle of the radius R drawn on the optical image ceases to be accurate at all. That is, in the form correction of the image data indicated by individual points of discrete coordinates, there is no pixel corresponding to the circle that the magnification can be made constant. It is thus good practice to use a method of determining coordinates $(X_i', Y_j')$ of a moved point in accordance with coordinates $(X_i, Y_j)$ of each pixel. In the case where at least two points of the coordinates $(X_i, Y_j)$ are moved to the coordinates $(X_i', Y_j')$, the average value of coordinates of pixels is photographed. When there is no moving point, it is only necessary that the values of the coordinates $(X_i', Y_j')$ of some surrounding pixels are used for interpolation.

Such a method is particularly effective for correction where, particularly in the electronic imaging apparatus using zoom lens, considerable image distortion is produced with respect to the optical axis because of manufacturing errors of the optical system and the electronic imaging device, and the circle of the radius R drawn on the optical image becomes asymmetrical. This method is also effective for correction where, in the imaging device or various output devices, geometrical distortion is produced when a signal is reproduced as an image.

In order to calculate the amount of correction r' ($\omega$)−r ($\omega$), the electronic imaging apparatus of the present invention may be constructed such that the relationship between the radius r ($\omega$), namely the half field angle and the image height or between a real image height r and an ideal image height r'/$\alpha$, is recorded in a recording medium housed in the electronic imaging apparatus.

Also, in order to obtain an image after the distortion correction in which the amount of light does not suffer a serious shortage at both ends of each minor side, it is preferable that the radius R satisfy the following conditional expression:

$$0 \leq R \leq 0.6 L_s$$

where $L_s$ is length of the minor side of the effective imaging surface.

The radius R should preferably satisfy the following conditional expression:

$$0.3 L_s \leq R \leq 0.6 L_s$$

It is most advantageous that the radius R is made to practically coincide with the radius of a circle coming into contact with the minor sides of the effective imaging surface. Also, when correction is made by holding the magnification constant in the proximity of the radius R=0, namely in axial proximity, the effect of a compact design can be ensured even in a wide-angle design, although somewhat disadvantageous for a substantial number of images.

Also, a focal-length section requiring correction is divided into some focal zones. Correction may be made by the same amount of correction as that with which the result of correction practically satisfying the following relation is obtained in the proximity of the telephoto end within each of divided focal zone:

$$r'(\omega) = \alpha f \tan \omega$$

In this case, however, the amount of barrel distortion remains to some extent at the wide-angle end in each divided focal zone. If the number of divided zones is increased, inherent data required for correction must be excessively stored in the recording medium, which is not very favorable. Thus, one or several coefficients relating to the focal length in each divided focal zone are previously calculated. It is only necessary that such a coefficient is determined on the basis of the measurement by a simulation or actual equipment. The amount of correction is calculated so that the result of correction practically satisfying the following relation is obtained in the proximity of the telephoto end within each divided focal zones:

$$r'(\omega) = \alpha f \tan \omega$$

The amount of correction may be evenly multiplied by the coefficient in accordance with the focal length to obtain the final amount of correction.

When an image obtained by imaging an infinite object is free of distortion, the following relation is established:

$$f = y/\tan \omega$$

where y is height of an image point from the optical axis (an image height), f is focal length of an imaging optical system (the zoom lens in the present invention), and $\omega$ is angle (a half field angle of the object) made by a direction of an object point corresponding to an image point, connecting the center of the effective imaging surface and the position of the image height y, with the optical axis.

When barrel distortion is produced in the imaging system, the following conditional expression is set:

$$f > y/\tan \omega$$

That is, when the focal length f and the image height y are made constant, the value of $\omega$ becomes large.

Preferably, provided is an image transformation section in which electric signals for an image photographed through the zoom lens are transformed into image signals that are corrected by image processing for color shifts from chromatic aberration of magnification. Electric correction of the zoom lens for chromatic aberration of magnification is going to make sure that much better images are obtained.

Generally speaking, an electronic still camera is designed such that the image of an object is separated into three primary color: the first, the second and the third primary color images, so that the respective output signals are superposed one upon another by operation to reconstruct a color image. Suppose here that a zoom lens has chromatic aberration of magnification. Then, given an image from light of the first primary color as a criterion, the positions where light of the second and the third primary colors are imaged are going to be off the position where the light of the first primary color is imaged. For electronic correction of the image for chromatic aberration of magnification, the amount of shifts of the imaging positions for the second and the third primary colors from that for the first primary color is previously found for each pixel of an imaging device based on aberration information about the zoom lens. Then, coordination transformation is implemented such that only the amount of the shifts from the first primary color is corrected for each pixel of the photographed image.

Referring typically to an image made up of three primary colors output signals of red (R), green (G) and blue (B), shifts of the imaging positions R and B from G are first found for each pixel. Then, coordination transformation is applied to the photographed image to eliminate any shift from G, and finally signals of R and G are output.

Chromatic aberration of magnification varies with zoom, focus and f numbers; it is preferable that the amount of shifts of the second and the third primary colors from the first primary color is stored as correction data in a storage device for each lens position (zoom, focus and f numbers). By referring to this correction data depending on the zoom position, it is possible to output the second and the third primary color signals that are corrected for the shifts of the second and the third primary colors from the first primary color signal.

To cut off unwanted light such as ghosts and flares, it is acceptable to rely on a flare stop other than the aperture stop. That flare stop may then be located somewhere on the object side of the first lens group, between the first and the second lens groups, between the second and the third lens groups, between the third and the fourth lens groups, between the fourth and the fifth lens groups, and between the group nearest to the image plane side and the image plane. A frame member or other member may also be located to cut off flare rays. Alternatively, the flare stop may directly be printed, coated or sealed on the optical system and may be formed into any desired shape including round, oval, rectangular, polygonal shapes or a shape delimited by a function curve. Further, not only a harmful light beam but also coma flares around the screen may be cut off.

Each lens may be applied with an antireflection coating to reduce ghosts and flares. A multicoating is then desired because of being capable of effectively reducing ghosts and flares. Each lens surface, a cover glass or the like may just as well be applied with an infrared cut coating.

The shading of brightness at the peripheral position of an image may be reduced by shifting the microlenses of a CCD. For example, the CCD microlens design may be modified in conformity with the angle of incidence of light rays at each image height, or decreases in the quantity of light at the peripheral position of the image may be corrected by image processing.

By the way, an antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, thereby obtaining images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, however, the reflection of light off the cementing surface would also be not negligible. In such a case, it is particularly effective to have an antireflection coating applied on the cementing surface.

Effective use of cementing surface coating is disclosed in JP-A-2-27301, 2001-324676 and 2005-92115 and U.S. Pat. No. 7,116,482, etc.

As a coating material to be used, it is possible to appropriately select, in accordance with the refractive index of an underlying lens and that of adhesive, a coating material having a comparatively high refractive index, such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$, or a comparatively low refractive index, such as $MgF_2$, $SiO_2$, $Al_2O_3$, and film thickness is set so as to satisfy a phase condition.

As a matter of fact, multi-coating can be applied to the cemented surface as in the case of coating application to the lens air contact surface. An appropriate combination of two or more layers of coating materials and various film thicknesses can further reduce the reflectivity and control reflectivity spectral characteristics, angular characteristics and the like. It goes without saying that the cemented surface coating can effectively be applied based on the same concept to cemented surfaces of the lenses other than those of the first lens group.

Figure 20:
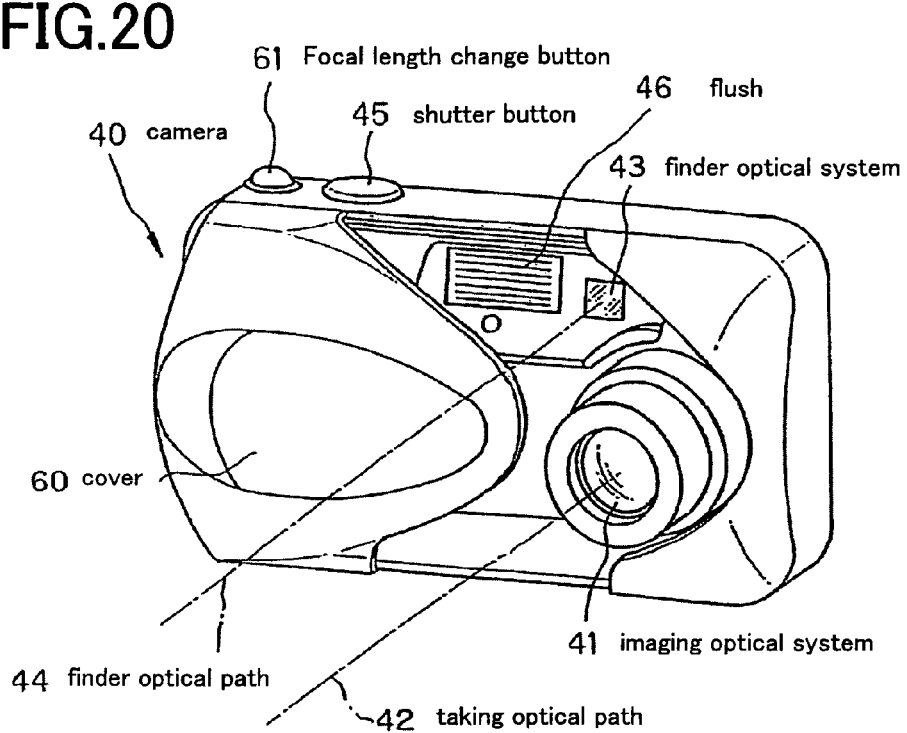
FIG. 20 is a front perspective view of the appearance of a digital camera according to the present invention.
Figure 21:
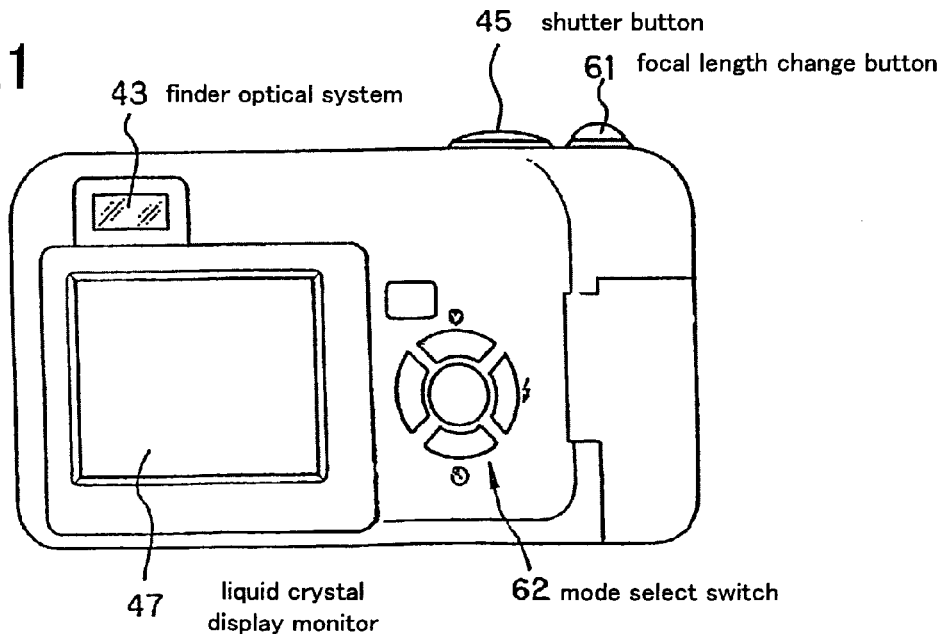
FIG. 21 is a rear perspective view of the digital camera of FIG. 20.
Figure 22:
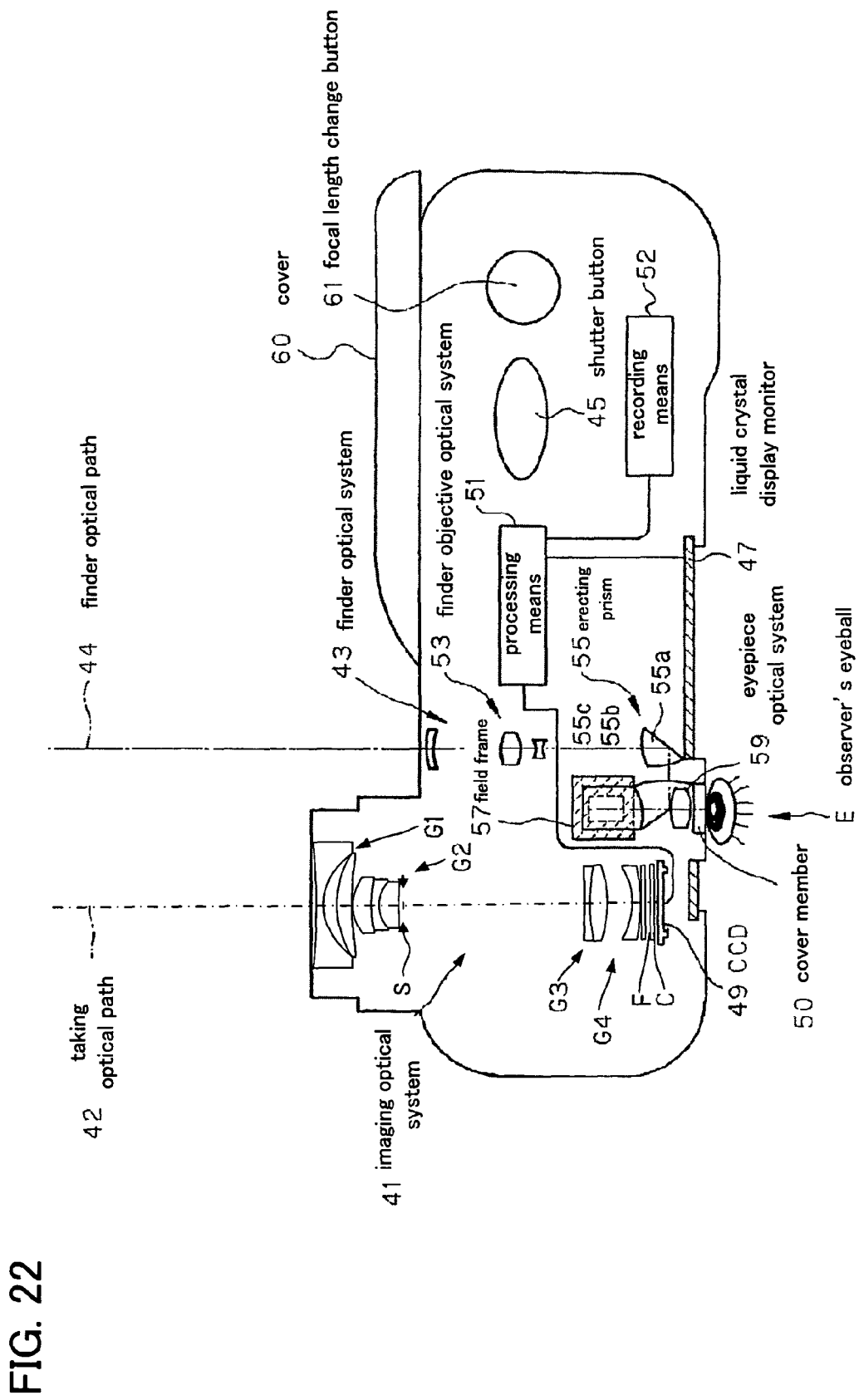
FIG. 22 is a sectional view of the digital camera of FIG. 20.

FIGS. 20 to 22 are conceptual illustrations of a digital camera, in which such an inventive zoom lens as set forth above is incorporated in a photographing optical system 41. FIG. 20 is a front perspective view of the appearance of a digital camera 40, FIG. 21 is a rear perspective view of the same; and FIG. 22 is a schematic sectional view of the configuration of the digital camera 40. However, FIGS. 20 and 22 show the state where the photographing optical system 41 is let out.

In this example, the digital camera 40 includes a photographing optical system 41 positioned on a photographing optical path 42, a finder optical system 43 positioned on a finder optical path 44, a shutter button 45, a flash 46, a liquid crystal display monitor 47, a focal length change button 61, a mode select switch 62, and the like. With the photographing optical system 41 received at a lens mount, a cover 60 is slid over the photographing optical system 41, finder optical system 43 and flash 46. When the cover 60 is slid open to place the camera 40 in operation, the photographing optical system 41 is let out, as in FIG. 20. When the shutter 45 mounted on the upper portion of the camera 40 is pressed down, an image is photographed through the photographing optical system 41, e.g., the zoom lens of Example 1. An object image formed by the photographing optical system 41 is formed on the imaging plane (photoelectric transformation plane) of a CCD 49 via a low-pass filter F with a wavelength limiting coating applied on it and a cover glass C.

An object image received at the CCD 49 is displayed as an electronic image on the liquid crystal display monitor 47 mounted on the back of the camera via a processing means 51. This processing means 51 is connected to a recording means 52 in which the photographed electronic image may be recorded. It is here noted that the recording means 52 may be provided separately from the processing means 51 or, alternatively, it may be constructed in such a way that images are electronically recorded and written therein by means of Floppy Discs®, memory cards, MOs or the like. This camera could also be set up in the form of a silver-halide camera using a silver-halide film in place of the CCD 49.

Moreover, a finder objective optical system 53 is located on the finder optical path 44. The finder objective optical system 53 includes a zoom optical system which is made up of a plurality of lens groups (three in FIGS. 20 to 22) and an erecting prism system 55 composed of erecting prisms 55a, 55b and 55c, and whose focal length varies in association with the zoom lens of the photographing optical system 41. An object image formed by the finder objective optical system 53 is in turn formed on a field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

Figure 23:
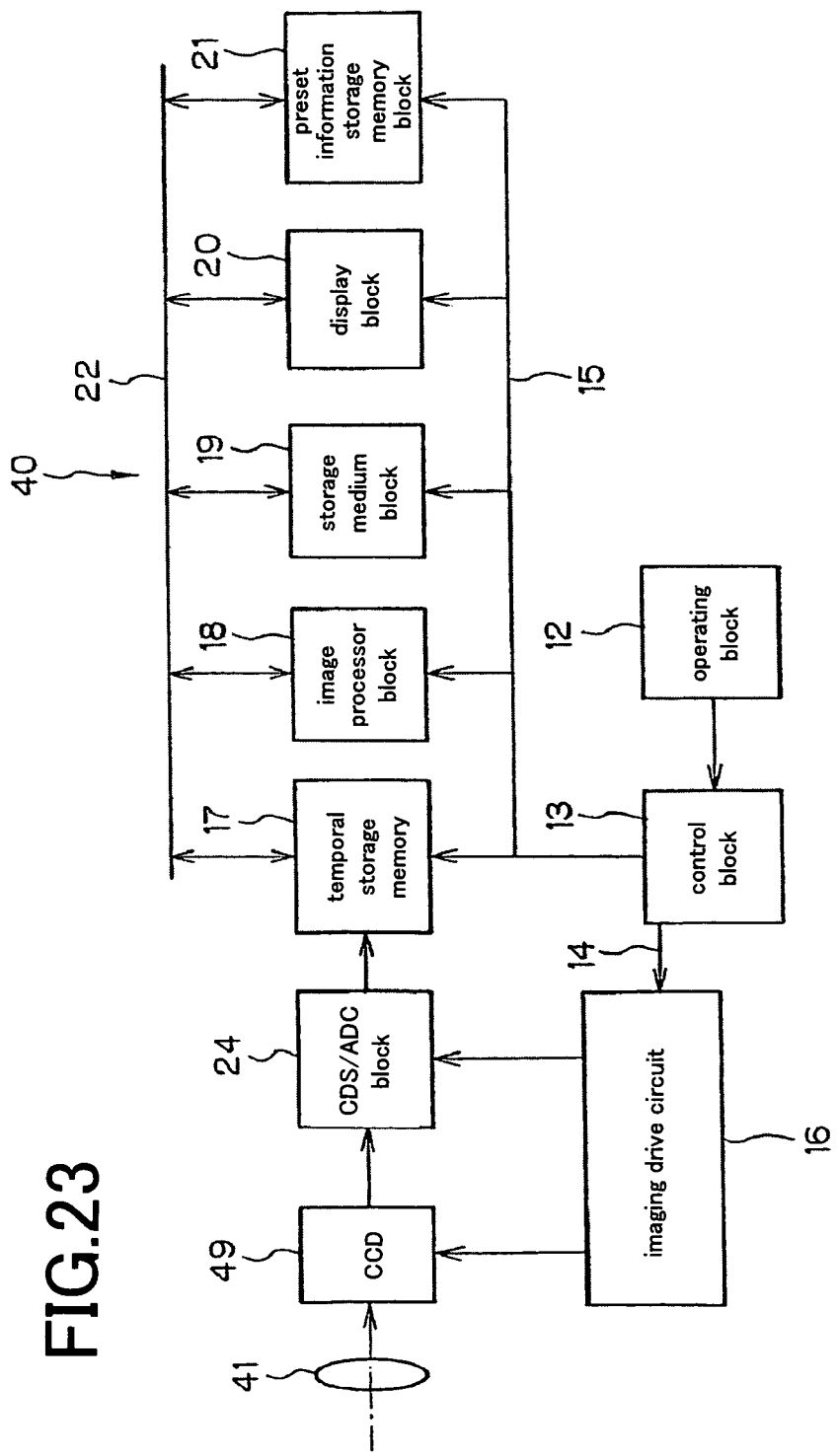
FIG. 23 is a block diagram showing a configuration of internal circuits in the main part of the digital camera of FIG. 20.

FIG. 23 is a block diagram showing internal circuits in the main part of the digital camera 40. In the following description, the processing means 51 includes, for example, a CDS/ADC section 24, a temporary storage memory 17, an image processing section 18 and the like, and the storage means 52 includes, for example, a storage medium section 19 and the like.

As shown in FIG. 23, the digital camera 40 includes an operating section 12, a control section 13 connected to the operating section 12 and an imaging drive circuit 16 connected to the control signal output port of the control section 13 via buses 14 and 15 as well as a temporary storage memory 17, an image processing section 18, a storage medium section 19, a display section 20 and a preset information storage memory section 21.

Data may be input to or output from the temporary storage memory 17, image processing section 18, storage medium section 19, display section 20 and preset information storage memory section 21 via a bus 22, and the imaging drive circuit 16 is connected to the CCD 49 and CDS/ADC section 24.

The operating section 12 provided with various input buttons and switches is a circuit through which event information input from outside (a camera operator) via such input buttons and switches is notified to the control section. The control section 13, which is a central processor including a CPU, is a circuit that, according to a program loaded in a program memory (not shown) stored therein, puts the whole digital camera 40 under control in response to the instruction and order input by the camera operator via the operating section 12.

The CCD 49 receives an object image formed through the photographing optical system 41 according to the present invention. The CCD 49 is an imaging device that is driven and controlled by the imaging drive circuit 16 to convert the quantity of light of that object image for each pixel into an electric signal and output it to the CDS/ADC section 24.

The CDS/ADC section 24 is a circuit that amplifies an electric signal input from the CCD 49 and subjects it to analog/digital conversion to output image raw data (Bayer data: hereinafter, referred to as "RAW data") only subjected to such amplification and digital conversion to the temporary storage memory 17.

The temporary storage memory 17, which is a buffer including an SDRAM for example, is a memory device that temporarily stores the RAW data output from the CDS/ADC section 24. The image processing section 18 is a circuit that reads the RAW data stored in the temporary storage memory 17 or the RAW data stored in the storage medium section 19 to implement a variety of image processing including distortion correction on the basis of an image quality parameter designated from the control section 13.

The recording medium section 19 is a control circuit that detachably receives a card type or stick type recording medium including, for example, a flash memory or the like so that the RAW data transferred from the temporary storage memory 17 or the image data subjected to image processing at the image processing section 18 are recorded and loaded in the card type or stick type flash memory.

The display section 20 is a circuit that includes a liquid crystal display monitor 47 to display images, menus or the like on that liquid crystal display monitor 47. The preset information storage memory section 21 includes a ROM section having various image quality parameters previously loaded in it and a RAM section in which an image quality parameter selected by input operation at the operating section 12 from the image quality parameters read out of that ROM section is stored. The preset information storage memory section 21 is a circuit that puts inputs in and outputs from those memories under control.

With the thus constructed digital camera 40, it is possible to achieve high performance, size reduction and wide-angle arrangement, because the photographing optical system 41 incorporated in it has high zoom capabilities and extremely stable image-formation capabilities all over the zoom range, while having a sufficient wide-angle arrangement and compact construction. Thus, it is possible to achieve faster focusing operation on the wide-angle and telephoto sides.

The present invention may be applied to not only the so-called compact digital camera adapted to photograph pictures of general objects but also a surveillance camera required to have wide angle of view and a lens interchangeable type camera.

What is claimed is:
1. A zoom lens comprising in order from an object side:
a first lens group with a negative refracting power;
a second lens group with a positive refracting power;
a third lens group with a positive refracting power; and
a fourth lens group with a refracting curved surface, wherein
upon zooming from a wide-angle end to telephoto end, at least the first lens group, second lens group, and third lens group move, and a spacing between the respective lens groups are changed,
the first lens group comprises, in order from the object side to an image side, a negative lens component with a negative refracting power and a positive lens component with a positive refracting power,
the total number of the lens components in the first lens group is two,
the second lens group comprises at least three lenses including at least one negative lens and at least one positive lens,
the second lens group comprises a plurality of cemented surfaces, at least two of which are obtained by cementing two face-to-face refracting surfaces of two lenses each having different curvature on the object side surface and image side surface,
the positive lens component in the first lens group and the negative lens component in the first lens group are separated by a thickness of an air gap on an optical axis, and
a total number of the lenses in the zoom lens is at least eight.
2. The zoom lens according to claim 1, wherein the zoom lens comprises an aperture stop that moves in unison with the second lens group upon zooming from a wide-angle end to telephoto end.
3. The zoom lens according to claim 1, wherein the second lens group satisfies the following conditional expression (1):

$$0.8 < D_{G2}/fw < 3.0 \qquad (1)$$

where $D_{G2}$ is thickness of the second lens group on the optical axis, and fw is focal length of the entire zoom lens system at the wide-angle end.

4. The zoom lens according to claim 1, wherein the second lens group comprises a plurality of positive lenses, one of which nearest to the object side and one of which nearest to the image side satisfy the following conditional expression (2):

$$0.5 < \phi_{G2PF}/\phi_{G2PR} < 25.0 \qquad (2)$$

where $\phi_{G2PF}$ is refracting power of the most object-side positive lens of the plurality of positive lenses included in the second lens group, and $\phi_{G2PR}$ is refracting power of the most image-side positive lens thereof.

5. The zoom lens according to claim 1, wherein the total number of the cemented surfaces in the second lens group satisfies the following conditional expression (3):

$$2 \leq N_{2Gcem} \leq 4 \qquad (3)$$

where $N_{2Gcem}$ is total number of the cemented surfaces in the second lens group, which is an integer.

6. The zoom lens according to claim 1, wherein the first lens group satisfies the following conditional expression (4):

$$0.10 < D_{L12}/D_{G1} < 0.80 \qquad (4)$$

where $D_{G1}$ is thickness of the first lens group on the optical axis, and $D_{L12}$ is distance on the optical axis between the negative lens component and positive lens component in the first lens group.

7. The zoom lens according to claim 1, wherein the negative lens component in the first lens group satisfies the following conditional expression (5):

$$-1.0 < (r1a+r1b)/(r1a-r1b) < 0.98 \qquad (5)$$

where r1a is paraxial curvature radius of the object side surface of the negative lens component in the first lens group, and r1b is paraxial curvature radius of the image side surface of the negative lens component in the first lens group.

8. The zoom lens according to claim 1, wherein the sum of the total number of the lens components in the third lens group and that of the lens components in the fourth lens group is three or less.

9. The zoom lens according to claim 1, wherein the fourth lens group has a negative refracting power, and the zoom lens is a four-group zoom lens.

10. The zoom lens according to claim 9, wherein the following conditional expression (6) is satisfied:

$$0.5 < D_{G3G4}/D_{L12} < 3 \qquad (6)$$

where $D_{G3G4}$ is distance on the optical axis between the third lens group and fourth lens group at the wide-angle end, and $D_{L12}$ is distance on the optical axis between the negative and positive lens components in the first lens group.

11. The zoom lens according to claim 1, wherein the first lens component satisfies the following conditional expression (7):

$$1.87 < AVE(nd_{G1}) < 2.40 \qquad (7)$$

where $AVE(nd_{G1})$ is average value of the refractive indices of all the lenses in the first lens group.

12. A zoom lens comprising in order from an object side:
a first lens group with a negative refracting power;
a second lens group with a positive refracting power; and
a third lens group with a positive refracting power, wherein
upon zooming from a wide-angle end to telephoto end, at least the first lens group, second lens group, and third lens group move, and a spacing between the respective lens groups are changed,
the second lens group comprises at least three lenses including at least one negative lens and at least one positive lens,
the second lens group comprises a plurality of cemented surfaces, at least two of which are obtained by cementing two face-to-face refracting surfaces of two lenses each having different curvature on the object side surface and image side surface,
the first lens group satisfies the following conditional expression (7):

$$1.87 < AVE(nd_{G1}) < 2.40 \qquad (7)$$

where AVE(ndG1) is average value of the refractive indices of all the lenses in the first lens group,
the first lens group comprises, in order from the object side, a negative lens component with a negative refracting power and a positive lens component with a positive refracting power,
the positive lens component in the first lens group and the negative lens component in the first lens group are separated by a thickness of an air gap on an optical axis, and
a total number of the lenses in the zoom lens is at least eight.

13. The zoom lens according to claim 12, comprising a fourth lens group having a refracting curved surface on the image side of the third lens group.

14. The zoom lens according to claim 1, wherein the fourth lens group remains fixed upon zooming.

15. The zoom lens according to claim 14, wherein the third lens group moves for focusing, and the first, second, and fourth lens groups remain fixed upon the focusing operation.

16. An imaging apparatus comprising:
a zoom lens; and
an imaging device having an imaging surface arranged on the image side of the zoom lens and is adapted to convert an optical image formed on the imaging surface into electric signals, wherein
the zoom lens is the zoom lens as claimed in claim 1.

17. The imaging apparatus according to claim 16, comprising an image transformation section that transforms the electric signals containing distortion from the zoom lens into image signals with distortion corrected by image processing.

18. The imaging apparatus according to claim 17, comprising an image transformation section that transforms the electric signals including chromatic aberration of magnification from the zoom lens into image signals in which the chromatic aberration of magnification has been corrected by image processing.

* * * * *